(12) United States Patent
Xu et al.

(10) Patent No.: US 11,677,506 B2
(45) Date of Patent: Jun. 13, 2023

(54) DYNAMIC TERMINATION OF HYBRID AUTOMATIC REPEAT REQUEST RETRANSMISSIONS

(71) Applicants: Changlong Xu, Beijing (CN); Hao Xu, Beijing (CN); Jing Jiang, San Diego, CA (US); Qualcomm Incorporated, San Diego, CA (US)

(72) Inventors: Changlong Xu, Beijing (CN); Hao Xu, Beijing (CN); Jing Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/765,557

(22) PCT Filed: Nov. 20, 2017

(86) PCT No.: PCT/CN2017/111863
§ 371 (c)(1),
(2) Date: May 20, 2020

(87) PCT Pub. No.: WO2019/095366
PCT Pub. Date: May 23, 2019

(65) Prior Publication Data
US 2020/0313802 A1    Oct. 1, 2020

(51) Int. Cl.
*H04L 1/1812* (2023.01)
*H04L 1/1825* (2023.01)
(Continued)

(52) U.S. Cl.
CPC .......... *H04L 1/1812* (2013.01); *H04L 1/1803* (2013.01); *H04L 1/188* (2013.01);
(Continued)

(58) Field of Classification Search
CPC .... H04W 72/08; H04W 76/27; H04L 1/1887; H04L 1/203; H04L 1/188; H04L 1/1812;
(Continued)

(56) References Cited

U.S. PATENT DOCUMENTS

2004/0037224 A1* 2/2004 Choi .................... H04L 1/1887
                                                                                       370/216
2005/0209804 A1* 9/2005 Basso ..................... H04L 69/28
                                                                                       702/79
(Continued)

FOREIGN PATENT DOCUMENTS

CN       101119184 A      2/2008
CN       101772073 A      7/2010
(Continued)

OTHER PUBLICATIONS

Supplementary European Search Report—EP17931839—Search Authority—The Hague—dated Jun. 7, 2021 (180362EP).
(Continued)

*Primary Examiner* — Kevin C. Harper
(74) *Attorney, Agent, or Firm* — Holland & Hart LLP

(57) ABSTRACT

Methods, systems, and devices for wireless communications are described. Some wireless communications systems may support hybrid automatic repeat request (HARQ) schemes to improve the likelihood that information is received correctly over a wireless communications link. In HARQ, when a transmitting device determines that a receiving device failed to successfully decode a transmission of information, the transmitting device may retransmit the information to the receiving device. In some cases, HARQ techniques may be used for communications associated with different types of services. In such cases, to keep the latency of communications within a latency budget for a particular type of service, wireless devices may utilize the techniques described herein to dynamically terminate HARQ retransmissions. For
(Continued)

instance, a transmitting device may avoid retransmitting information when an amount of time that has elapsed since an original transmission of the information has exceeded the latency budget.

28 Claims, 16 Drawing Sheets

(51) Int. Cl.
| | | |
|---|---|---|
| | *H04L 1/1867* | (2023.01) |
| | *H04L 1/1829* | (2023.01) |
| | *H04L 1/1803* | (2023.01) |
| | H04W 76/27 | (2018.01) |
| | H04L 1/20 | (2006.01) |
| | H04W 72/54 | (2023.01) |

(52) U.S. Cl.
CPC .......... *H04L 1/1825* (2013.01); *H04L 1/1848* (2013.01); *H04L 1/1896* (2013.01); *H04L 1/1887* (2013.01); *H04L 1/203* (2013.01); *H04W 72/54* (2023.01); *H04W 76/27* (2018.02)

(58) Field of Classification Search
CPC ... H04L 1/1896; H04L 1/1825; H04L 1/1803; H04L 1/1848
See application file for complete search history.

(56) References Cited

U.S. PATENT DOCUMENTS

| | | | |
|---|---|---|---|
| 2007/0041349 A1 | 2/2007 | Kim et al. | |
| 2008/0209297 A1 | 8/2008 | Chandra et al. | |
| 2008/0304447 A1 | 12/2008 | Kim et al. | |
| 2010/0229064 A1* | 9/2010 | Omeni | H04L 1/1803 714/E11.113 |
| 2011/0069668 A1* | 3/2011 | Chion | H04L 1/1829 370/328 |
| 2011/0075579 A1 | 3/2011 | Seymour et al. | |
| 2012/0089892 A1* | 4/2012 | Kang | H04L 1/188 714/E11.003 |
| 2016/0119948 A1 | 4/2016 | Damnjanovic et al. | |
| 2016/0212057 A1 | 7/2016 | Hahm | |
| 2017/0041102 A1* | 2/2017 | Lu | H04L 1/08 |
| 2017/0094568 A1* | 3/2017 | Yang | H04W 48/16 |
| 2018/0331788 A1* | 11/2018 | Kim | H04L 1/007 |
| 2018/0352471 A1* | 12/2018 | Benammar | H04L 1/1887 |

FOREIGN PATENT DOCUMENTS

| | | |
|---|---|---|
| CN | 102223210 A | 10/2011 |
| CN | 102548011 A | 7/2012 |
| CN | 102625432 A | 8/2012 |
| CN | 102983955 A | 3/2013 |
| CN | 103391554 A | 11/2013 |
| CN | 106304377 A | 1/2017 |
| EP | 1507352 A1 | 2/2005 |
| EP | 1863238 A1 | 12/2007 |
| WO | WO-2007079085 A2 | 7/2007 |
| WO | WO-2016185081 A1 | 11/2016 |

OTHER PUBLICATIONS

International Search Report and Written Opinion—PCT/CN2017/111863—ISA/EPO—Aug. 9, 2018 (180362WO1).

* cited by examiner

DYNAMIC TERMINATION OF HYBRID AUTOMATIC REPEAT REQUEST RETRANSMISSIONS

CROSS REFERENCE

The present application is a 371 national phase of International Patent Application No. PCT/CN2017/111863 by Xu et al., entitled "DYNAMIC TERMINATION OF HYBRID AUTOMATIC REPEAT REQUEST RETRANSMISSIONS," filed Nov. 20, 2017, assigned to the assignee hereof.

BACKGROUND

The following relates generally to wireless communication and more specifically to a dynamic termination of hybrid automatic repeat request (HARQ) retransmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Base stations and UEs may support error correction schemes to improve the chances that transmissions are correctly received. HARQ is one example of an error correction scheme that increases the likelihood that information is received correctly over a wireless communications link. In HARQ, when a transmitting device receives an indication or otherwise determines that a receiving device failed to successfully decode a transmission of information, the transmitting device may retransmit the information to the receiving device. In some cases, however, it may be challenging for devices, such as base stations and UEs, to balance a number of HARQ retransmissions with latency in a wireless communications system.

SUMMARY

Some wireless communications systems may support hybrid automatic repeat request (HARQ) schemes to improve the likelihood that information is received correctly over a wireless communications link. In HARQ, when a transmitting device determines that a receiving device failed to successfully decode a transmission of information, the transmitting device may retransmit the information to the receiving device. In some cases, HARQ techniques may be used for communications associated with different types of services. In such cases, to keep the latency of communications within a latency budget for a particular type of service, wireless devices may utilize the techniques described herein to dynamically terminate HARQ retransmissions. For instance, a transmitting device may avoid retransmitting information when an amount of time that has elapsed since an original transmission of the information has exceeded the latency budget.

A method for wireless communication is described. The method may include receiving data at a user equipment (UE) from a base station, the data associated with a type of service, transmitting, to the base station, an indication that decoding of the data was unsuccessful, identifying an absolute latency value based at least in part on transmitting the indication, the absolute latency value corresponding to the type of service associated with the data, and monitoring or avoiding monitoring for a retransmission of the data from the base station based at least in part on the identified absolute latency value.

An apparatus for wireless communication is described. The apparatus may include means for receiving data at a UE from a base station, the data associated with a type of service, means for transmitting, to the base station, an indication that decoding of the data was unsuccessful, means for identifying an absolute latency value based at least in part on transmitting the indication, the absolute latency value corresponding to the type of service associated with the data, and means for monitoring or avoiding monitoring for a retransmission of the data from the base station based at least in part on the identified absolute latency value.

Another apparatus for wireless communication is described. The apparatus may include a processor, memory in electronic communication with the processor, and instructions stored in the memory. The instructions may be operable to cause the processor to receive data at a UE from a base station, the data associated with a type of service, transmit, to the base station, an indication that decoding of the data was unsuccessful, identify an absolute latency value based at least in part on transmitting the indication, the absolute latency value corresponding to the type of service associated with the data, and monitor or avoiding monitoring for a retransmission of the data from the base station based at least in part on the identified absolute latency value.

A non-transitory computer-readable medium for wireless communication is described. The non-transitory computer-readable medium may include instructions operable to cause a processor to receive data at a UE from a base station, the data associated with a type of service, transmit, to the base station, an indication that decoding of the data was unsuccessful, identify an absolute latency value based at least in part on transmitting the indication, the absolute latency value corresponding to the type of service associated with the data, and monitor or avoiding monitoring for a retransmission of the data from the base station based at least in part on the identified absolute latency value.

Some examples of the method, apparatus, and non-transitory computer-readable medium described above may further include processes, features, means, or instructions for receiving radio resource control (RRC) signaling that indicates the absolute latency value corresponding to the type of service that may be associated with the data, where the absolute latency value may be identified based at least in part on the RRC signaling. In some examples of the method, apparatus, and non-transitory computer-readable medium described above, identifying the absolute latency value includes identifying the absolute latency value based at least in part on a table that indicates absolute latency values corresponding to different types of services.

Some examples of the method, apparatus, and non-transitory computer-readable medium described above may further include processes, features, means, or instructions for determining that a latency value associated with one or more transmissions of the data fails to exceed the absolute latency value and monitoring for the retransmission of the data from the base station based at least in part on the determining. Some examples of the method, apparatus, and non-transitory computer-readable medium described above may further include processes, features, means, or instructions for determining that a latency value associated with one or more transmissions of the data may have exceeded the absolute latency value and avoiding monitoring for the retransmission of the data from the base station based at least in part on the determining. In some examples of the method, apparatus, and non-transitory computer-readable medium described above, a maximum number of retransmissions of the data may be based at least in part on the absolute latency value corresponding to the type of service associated with the data.

A method for wireless communication is described. The method may include transmitting data from a UE to a base station, the data associated with a type of service, determining that the base station failed to successfully decode the data, identifying an absolute latency value based at least in part on the determining, the absolute latency value corresponding to the type of service that is associated with the data, and retransmitting or avoiding retransmitting the data to the base station based at least in part on the identified absolute latency value.

An apparatus for wireless communication is described. The apparatus may include means for transmitting data from a UE to a base station, the data associated with a type of service, means for determining that the base station failed to successfully decode the data, means for identifying an absolute latency value based at least in part on the determining, the absolute latency value corresponding to the type of service that is associated with the data, and means for retransmitting or avoiding retransmitting the data to the base station based at least in part on the identified absolute latency value.

Another apparatus for wireless communication is described. The apparatus may include a processor, memory in electronic communication with the processor, and instructions stored in the memory. The instructions may be operable to cause the processor to transmit data from a UE to a base station, the data associated with a type of service, determine that the base station failed to successfully decode the data, identify an absolute latency value based at least in part on the determining, the absolute latency value corresponding to the type of service that is associated with the data, and retransmit or avoiding retransmitting the data to the base station based at least in part on the identified absolute latency value.

A non-transitory computer-readable medium for wireless communication is described. The non-transitory computer-readable medium may include instructions operable to cause a processor to transmit data from a UE to a base station, the data associated with a type of service, determine that the base station failed to successfully decode the data, identify an absolute latency value based at least in part on the determining, the absolute latency value corresponding to the type of service that is associated with the data, and retransmit or avoiding retransmitting the data to the base station based at least in part on the identified absolute latency value.

Some examples of the method, apparatus, and non-transitory computer-readable medium described above may further include processes, features, means, or instructions for receiving RRC signaling that indicates the absolute latency value corresponding to the type of service that may be associated with the data, where the absolute latency value may be identified based at least in part on the RRC signaling. In some examples of the method, apparatus, and non-transitory computer-readable medium described above, identifying the absolute latency value includes identifying the absolute latency value based at least in part on a table that indicates absolute latency values corresponding to different types of services. In some examples of the method, apparatus, and non-transitory computer-readable medium described above, determining that the base station failed to successfully decode the data includes receiving, from the base station, an indication that decoding of the data was unsuccessful.

Some examples of the method, apparatus, and non-transitory computer-readable medium described above may further include processes, features, means, or instructions for determining that a latency value associated with one or more transmissions of the data fails to exceed the absolute latency value and retransmitting the data to the base station based at least in part on the determining. Some examples of the method, apparatus, and non-transitory computer-readable medium described above may further include processes, features, means, or instructions for determining that a latency value associated with one or more transmissions of the data may have exceeded the absolute latency value and avoiding retransmitting the data to the base station based at least in part on the determining. In some examples of the method, apparatus, and non-transitory computer-readable medium described above, a maximum number of retransmissions of the data may be based at least in part on the absolute latency value corresponding to the type of service associated with the data.

A method for wireless communication is described. The method may include receiving DCI that schedules an uplink or downlink transmission of data, receiving, in the DCI, an indication of whether the uplink or downlink transmission is a final transmission of the data, and transmitting the data in the uplink transmission or receiving the data in the downlink transmission based at least in part on the DCI.

An apparatus for wireless communication is described. The apparatus may include means for receiving DCI that schedules an uplink or downlink transmission of data, means for receiving, in the DCI, an indication of whether the uplink or downlink transmission is a final transmission of the data, and means for transmitting the data in the uplink transmission or receiving the data in the downlink transmission based at least in part on the DCI.

Another apparatus for wireless communication is described. The apparatus may include a processor, memory in electronic communication with the processor, and instructions stored in the memory. The instructions may be operable to cause the processor to receive DCI that schedules an uplink or downlink transmission of data, receive, in the DCI, an indication of whether the uplink or downlink transmission is a final transmission of the data, and transmit the data in the uplink transmission or receiving the data in the downlink transmission based at least in part on the DCI.

A non-transitory computer-readable medium for wireless communication is described. The non-transitory computer-readable medium may include instructions operable to cause a processor to receive DCI that schedules an uplink or downlink transmission of data, receive, in the DCI, an indication of whether the uplink or downlink transmission is a final transmission of the data, and transmit the data in the uplink transmission or receiving the data in the downlink transmission based at least in part on the DCI.

In some examples of the method, apparatus, and non-transitory computer-readable medium described above, an amount of resources allocated for the uplink transmission or the downlink transmission may be based at least in part on a block error rate (BLER) target of a type of service associated with the data. In some examples of the method, apparatus, and non-transitory computer-readable medium described above, the amount of resources allocated for the uplink transmission or the downlink transmission may be further based at least in part on an amount of resources available for the uplink transmission or the downlink transmission.

A method of wireless communication is described. The method may include receiving data at a base station from a UE, the data associated with a type of service, transmitting, to the UE, an indication that decoding of the data was unsuccessful, identifying an absolute latency value based at least in part on transmitting the indication, the absolute latency value corresponding to the type of service associated with the data, and monitoring or avoiding monitoring for a retransmission of the data from the UE based at least in part on the identified absolute latency value.

An apparatus for wireless communication is described. The apparatus may include means for receiving data at a base station from a UE, the data associated with a type of service, means for transmitting, to the UE, an indication that decoding of the data was unsuccessful, means for identifying an absolute latency value based at least in part on transmitting the indication, the absolute latency value corresponding to the type of service associated with the data, and means for monitoring or avoiding monitoring for a retransmission of the data from the UE based at least in part on the identified absolute latency value.

Another apparatus for wireless communication is described. The apparatus may include a processor, memory in electronic communication with the processor, and instructions stored in the memory. The instructions may be operable to cause the processor to receive data at a base station from a UE, the data associated with a type of service, transmit, to the UE, an indication that decoding of the data was unsuccessful, identify an absolute latency value based at least in part on transmitting the indication, the absolute latency value corresponding to the type of service associated with the data, and monitor or avoiding monitoring for a retransmission of the data from the UE based at least in part on the identified absolute latency value.

A non-transitory computer-readable medium for wireless communication is described. The non-transitory computer-readable medium may include instructions operable to cause a processor to receive data at a base station from a UE, the data associated with a type of service, transmit, to the UE, an indication that decoding of the data was unsuccessful, identify an absolute latency value based at least in part on transmitting the indication, the absolute latency value corresponding to the type of service associated with the data, and monitor or avoiding monitoring for a retransmission of the data from the UE based at least in part on the identified absolute latency value.

In some examples of the method, apparatus, and non-transitory computer-readable medium described above, identifying the absolute latency value includes identifying the absolute latency value based at least in part on a table that indicates absolute latency values corresponding to different types of services. Some examples of the method, apparatus, and non-transitory computer-readable medium described above may further include processes, features, means, or instructions for determining that a latency value associated with one or more transmissions of the data fails to exceed the absolute latency value and monitoring for the retransmission of the data from the UE based at least in part on the determining. Some examples of the method, apparatus, and non-transitory computer-readable medium described above may further include processes, features, means, or instructions for determining that a latency value associated with one or more transmissions of the data may have exceeded the absolute latency value and avoiding monitoring for the retransmission of the data from the UE based at least in part on the determining. In some examples of the method, apparatus, and non-transitory computer-readable medium described above, a maximum number of retransmissions of the data may be based at least in part on the absolute latency value corresponding to the type of service associated with the data.

A method of wireless communication is described. The method may include transmitting data from a base station to a UE, the data associated with a type of service, determining that the UE failed to successfully decode the data, identifying an absolute latency value based at least in part on the determining, the absolute latency value corresponding to the type of service that is associated with the data, and retransmitting or avoiding retransmitting the data to the UE based at least in part on the identified absolute latency value.

An apparatus for wireless communication is described. The apparatus may include means for transmitting data from a base station to a UE, the data associated with a type of service, means for determining that the UE failed to successfully decode the data, means for identifying an absolute latency value based at least in part on the determining, the absolute latency value corresponding to the type of service that is associated with the data, and means for retransmitting or avoiding retransmitting the data to the UE based at least in part on the identified absolute latency value.

Another apparatus for wireless communication is described. The apparatus may include a processor, memory in electronic communication with the processor, and instructions stored in the memory. The instructions may be operable to cause the processor to transmit data from a base station to a UE, the data associated with a type of service, determine that the UE failed to successfully decode the data, identify an absolute latency value based at least in part on the determining, the absolute latency value corresponding to the type of service that is associated with the data, and retransmit or avoiding retransmitting the data to the UE based at least in part on the identified absolute latency value.

A non-transitory computer-readable medium for wireless communication is described. The non-transitory computer-readable medium may include instructions operable to cause a processor to transmit data from a base station to a UE, the data associated with a type of service, determine that the UE failed to successfully decode the data, identify an absolute latency value based at least in part on the determining, the absolute latency value corresponding to the type of service that is associated with the data, and retransmit or avoiding retransmitting the data to the UE based at least in part on the identified absolute latency value.

In some examples of the method, apparatus, and non-transitory computer-readable medium described above, identifying the absolute latency value includes identifying the absolute latency value based at least in part on a table that indicates absolute latency values corresponding to different types of services. In some examples of the method, apparatus, and non-transitory computer-readable medium described above, determining that the UE failed to successfully decode the data includes receiving, from the UE, an indication that decoding of the data was unsuccessful. Some examples of the method, apparatus, and non-transitory computer-readable medium described above may further include processes, features, means, or instructions for determining that a latency value associated with one or more transmissions of the data fails to exceed the absolute latency value and retransmitting the data to the UE based at least in part on the determining. Some examples of the method, apparatus, and non-transitory computer-readable medium described above may further include processes, features, means, or instructions for determining that a latency value associated with one or more transmissions of the data may have exceeded the absolute latency value and avoiding retransmitting the data to the UE based at least in part on the determining. In some examples of the method, apparatus, and non-transitory computer-readable medium described above, a maximum number of retransmissions of the data may be based at least in part on the absolute latency value corresponding to the type of service associated with the data.

A method of wireless communication is described. The method may include transmitting DCI that schedules an uplink or downlink transmission of data, transmitting, in the DCI, an indication of whether the uplink or downlink transmission is a final transmission of the data, and transmitting the data in the downlink transmission or receiving the data in the uplink transmission based at least in part on the DCI.

An apparatus for wireless communication is described. The apparatus may include means for transmitting DCI that schedules an uplink or downlink transmission of data, means for transmitting, in the DCI, an indication of whether the uplink or downlink transmission is a final transmission of the data, and means for transmitting the data in the downlink transmission or receiving the data in the uplink transmission based at least in part on the DCI.

Another apparatus for wireless communication is described. The apparatus may include a processor, memory in electronic communication with the processor, and instructions stored in the memory. The instructions may be operable to cause the processor to transmit DCI that schedules an uplink or downlink transmission of data, transmit, in the DCI, an indication of whether the uplink or downlink transmission is a final transmission of the data, and transmit the data in the downlink transmission or receiving the data in the uplink transmission based at least in part on the DCI.

A non-transitory computer-readable medium for wireless communication is described. The non-transitory computer-readable medium may include instructions operable to cause a processor to transmit DCI that schedules an uplink or downlink transmission of data, transmit, in the DCI, an indication of whether the uplink or downlink transmission is a final transmission of the data, and transmit the data in the downlink transmission or receiving the data in the uplink transmission based at least in part on the DCI.

Some examples of the method, apparatus, and non-transitory computer-readable medium described above may further include processes, features, means, or instructions for determining a BLER target of a type of service associated with the data and allocating resources for the final transmission based at least in part on the BLER target. In some examples of the method, apparatus, and non-transitory computer-readable medium described above, allocating resources for the final transmission based at least in part on the BLER target includes identifying a first amount of resources to be used for the final transmission to satisfy the BLER target, determining that a second amount of resources available for the final transmission may be greater than or equal to the first amount of resources, and allocating the first amount of resources for the final transmission.

In some examples of the method, apparatus, and non-transitory computer-readable medium described above, allocating resources for the final transmission based at least in part on the BLER target includes identifying a first amount of resources to be used for the final transmission to satisfy the BLER target, determining that a second amount of resources available for the final transmission may be less than the first amount of resources, and allocating the second amount of resources for the final transmission. In some examples of the method, apparatus, and non-transitory computer-readable medium described above, allocating resources for the final transmission based at least in part on the BLER target includes identifying a first amount of resources to be used for the final transmission to satisfy the BLER target, determining that a second amount of resources available for the final transmission may be less than the first amount of resources, and allocating less resources than the second amount of resources for the final transmission.

DETAILED DESCRIPTION

Figure 1:
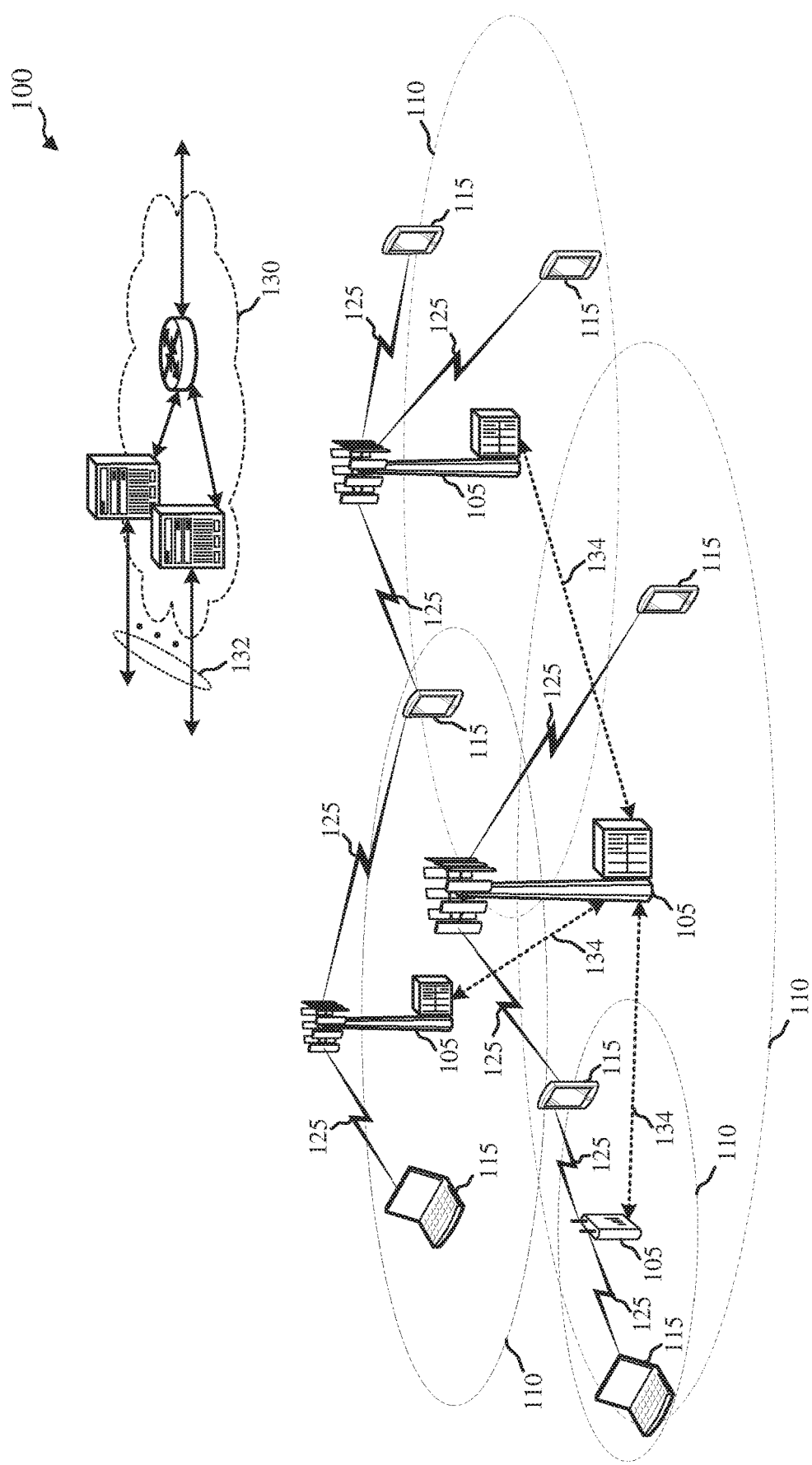
FIG. 1 illustrates an example of a wireless communications system that supports a dynamic termination of hybrid automatic repeat request (HARQ) retransmissions in accordance with aspects of the present disclosure.

Some wireless communications systems may support error correction schemes to improve the likelihood that information is correctly received by a receiving device. One example of an error correction scheme is a hybrid automatic repeat request (HARQ) scheme. In HARQ, when a transmitting device determines that a receiving device failed to successfully decode information transmitted to the receiving device (e.g., based on receiving a negative acknowledgement (NACK) or failing to receive HARQ feedback), the transmitting device may retransmit the information to the receiving device. In some cases, HARQ techniques may be used for communications associated with different types of services. In such cases, however, if a number of HARQ retransmissions is not limited for communications associated with a type of service, and HARQ retransmissions are scheduled after the latency budget corresponding to the type of service is exceeded, the retransmitted information may be useless and resources allocated for such retransmissions may be wasted.

Accordingly, some wireless communications systems may support techniques for configuring a maximum number of HARQ retransmissions for HARQ procedures at a base station and a user equipment (UE) (e.g., for different types of services). In some cases, the base station may signal an indication of the maximum number of retransmissions to a UE (e.g., via radio resource control (RRC) signaling). As such, a transmitting device may avoid retransmitting information to a receiving device after the transmitting device has retransmitted the information the maximum number of times. Further, after a receiving device receives the maximum number of retransmissions, the receiving device may pass the information received in an original transmission and other retransmissions (i.e., up to the maximum number of retransmissions) to upper layers for processing, and the receiving device may avoid monitoring or waiting for additional retransmissions.

In some cases, however, the relationship between a maximum number of retransmissions and latency may vary. For instance, in asynchronous HARQ, the intervals between previous transmissions (or retransmissions) and subsequent retransmissions may vary across transmissions. Similarly, for communications using time division duplexing (TDD), the intervals between previous transmissions (or retransmissions) and subsequent retransmission may also vary across transmissions (e.g., for different TDD configurations). As a result, when a transmitting device retransmits information to a receiving device the maximum number of times, the latency associated with the transmissions of the information may or may not exceed a latency budget (e.g., depending on the varying intervals between transmissions), which may be detrimental to a wireless communications system.

As described herein, a wireless communications system may support efficient techniques for dynamically configuring a maximum number of HARQ retransmissions within a latency budget. For example, a transmitting device may determine whether to retransmit information to a receiving device based on a latency budget corresponding to a type of service associated with the data, and the receiving device may determine whether to monitor for a retransmission of the information based on the latency budget. Thus, the maximum number of retransmissions in a HARQ scheme for different types of services may be configured dynamically depending on the latency budget of the different types of services, which may improve the efficiency of the HARQ scheme.

Aspects of the disclosure introduced above are described below in the context of a wireless communications system. Examples of processes and signaling exchanges that support a dynamic termination of HARQ retransmissions are then described. Aspects of the disclosure are further illustrated by and described with reference to apparatus diagrams, system diagrams, and flowcharts that relate to a dynamic termination of HARQ retransmissions.

FIG. 1 illustrates an example of a wireless communications system 100 that supports a dynamic termination of HARQ retransmissions in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support various types of services, including services for enhanced mobile broadband (eMBB) communications, ultra-reliable (e.g., mission critical) communications, low latency communications, ultra-reliable low latency communications (URLLC), or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID), etc.) operating via the same or a different carrier. In some examples, a carrier may support multiple cells, and different cells may be configured according to different protocol types (e.g., machine-type communication (MTC), narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable an automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some cases, UEs 115 and base stations 105 may support retransmissions of data to increase the likelihood that data is received successfully. HARQ feedback is one technique of increasing the likelihood that data is received correctly over a communication link 125. HARQ feedback may include the transmission of an acknowledgement (ACK) from a receiving device to indicate that data (or other information) received from the transmitting device was successfully decoded, and the transmission of a negative acknowledgement (NACK) from a receiving device to indicate that the receiving device failed to successfully decode the data (or other information) received from the transmitting device. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions).

In HARQ, when a transmitting device determines that a receiving device failed to successfully decode information transmitted to the receiving device, the transmitting device may retransmit the information to the receiving device. In some cases, the information may be associated with a type of service (e.g., a low latency service), and the type of service may be associated with a block error rate (BLER) target (e.g., $10^{-5}$ or $10^{-9}$) and a latency budget (e.g., 0.5 ms or 10 ms). The BLER target may correspond to a reliability target for the information, and the latency budget may correspond to a time period during which transmissions can be used by a receiving device. In some cases, to satisfy the BLER target, it may be appropriate for a transmitting device to retransmit information to a receiving device multiple times. However, after a certain number of retransmissions, a latency budget associated with the information being retransmitted may be exceeded, and a receiving device may not be able to use the retransmitted information after the latency budget is exceeded. That is, after a latency budget is exceeded, further retransmissions of the information may be wasteful.

Accordingly, some wireless communications systems may support techniques for configuring a maximum number of HARQ retransmissions for HARQ procedures at transmitting and receiving devices (e.g., for different types of services). Thus, a transmitting device may retransmit information to a receiving device until the transmitting device receives an ACK or until the transmitting device retransmits the information the maximum number of times (e.g., based on receiving one or more NACKs from the receiving device). In some cases, there may be a direct relationship between a maximum number of retransmissions and an amount of time that has elapsed since an original transmission (i.e., latency). That is, as the maximum number of retransmissions is incremented, the amount of time since an original transmission is increased by a constant. This direct relationship between the maximum number of retransmissions and latency may be seen in communications using synchronous HARQ or for communications using FDD where a retransmission interval (i.e., a time interval between retransmissions) may be fixed and the latency may be accurately deduced from the number of retransmissions.

In other cases, however, the relationship between a number of retransmissions and latency may vary. For example, in communications using asynchronous HARQ and different TDD configurations, the retransmission intervals may vary across transmissions. For example, an interval between a first transmission and a second transmission may be different from an interval between the second transmission and a third transmission. Further, the intervals between transmissions may vary across HARQ procedures. For example, an interval between a first transmission and a second transmission in one HARQ procedure may be different from an interval between a first transmission and a second transmission in another HARQ procedure. As a result, the latency associated with a fixed number of retransmissions may be unpredictable.

In such cases, if a fixed maximum number of retransmissions is configured for a particular service, the latency of communications associated with the type of service may or may not exceed the latency budget corresponding to the type of service depending on the intervals between transmissions in a HARQ procedure. If the latency exceeds the latency budget and another retransmission is scheduled (e.g., because the maximum number of retransmissions was not reached), the resources configured for the retransmission may be wasted since the retransmission may not be used by the receiving device. Alternatively, if the latency fails to exceed the latency budget but the maximum number of retransmissions was reached, another retransmission may not be scheduled, and the BLER target may not be satisfied. Wireless communications system 100 may support efficient techniques for dynamically configuring a maximum number of retransmissions to improve the chances of satisfying a BLER target and remaining within a latency budget for communications using a HARQ scheme.

Figure 2A:
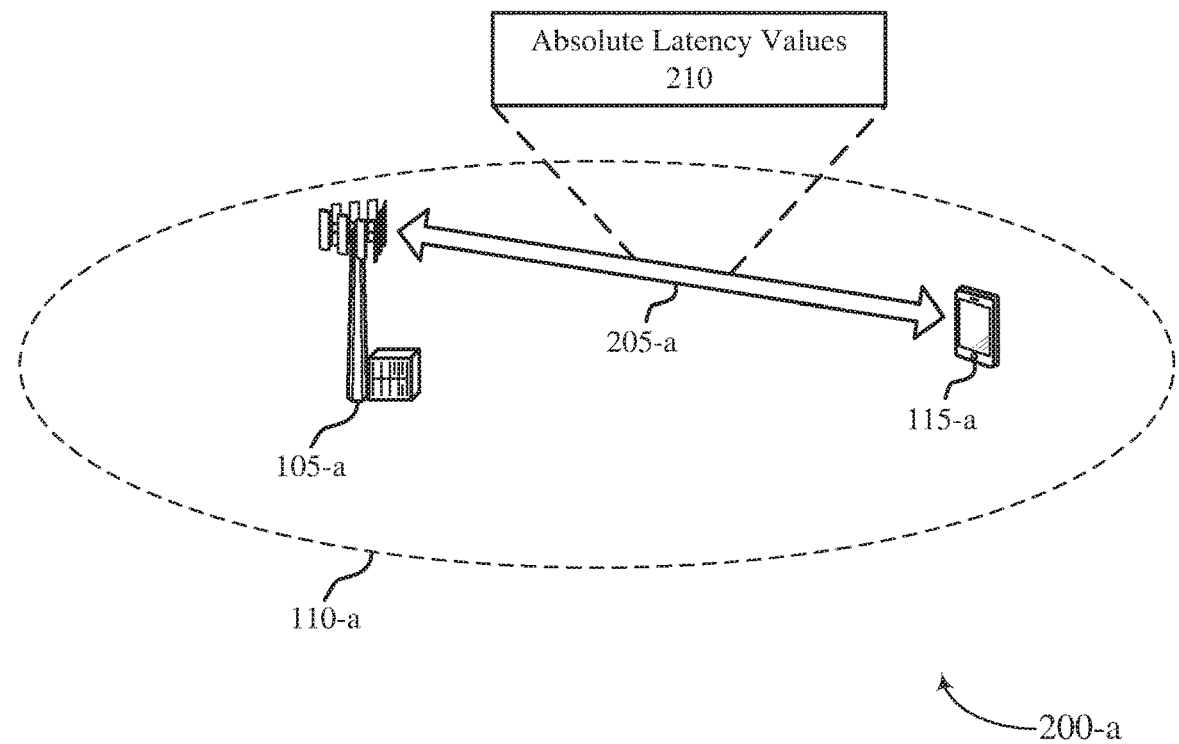
FIGS. 2A and 2B illustrate examples of wireless communications systems that support a dynamic termination of HARQ retransmissions in accordance with aspects of the present disclosure.

FIG. 2A illustrates an example of a wireless communications system 200-a that supports a dynamic termination of HARQ retransmissions in accordance with various aspects of the present disclosure. Wireless communications system 200-a includes base station 105-a and UE 115-a, which may be examples of the corresponding devices described with reference to FIG. 1. Base station 105-a may communicate with UEs 115 (including UE 115-a) within coverage area 110-a. For example, base station 105-a may communicate with UE 115-a on resources of a carrier 205-a.

Wireless communications system 200-a may implement aspects of wireless communications system 100. For example, wireless communications system 200-a may support a HARQ scheme for communications between base station 105-a and UE 115-a. In HARQ, when a transmitting device (e.g., base station 105-a or UE 115-a) determines that a receiving device (e.g., base station 105-a or UE 115-a) failed to decode a transmission or retransmission of information, the transmitting device may retransmit the information to the receiving device. In some cases, however, after a certain number of retransmissions, an amount of time that has elapsed since an original transmission may exceed a latency budget, and another retransmission may be unnecessary and wasteful. To increase the efficiency of the HARQ scheme, the transmitting device may use the techniques described herein to determine whether to retransmit information to the receiving device. Similarly, the receiving device may determine whether to monitor for a retransmission of the information using the techniques described herein.

In particular, the transmitting device may determine whether to retransmit information to the receiving device based on an absolute latency value corresponding to a type of service associated with the information. Similarly, the receiving device may determine whether to monitor for a retransmission of the information based on the absolute latency value. The absolute latency value may correspond to a latency budget that indicates a duration (e.g., 0.5 ms, 1 ms, 2 ms, etc.) during which transmissions or retransmissions of data may be used by a receiving device. After this latency budget is exceeded, a receiving device may not be able to use any transmissions or retransmissions of the information. As such, any resources allocated for further transmissions or retransmissions of the information after the latency budget is exceeded may be wasted.

In some cases, base station 105-a and UE 115-a may identify an absolute latency value corresponding to a type of service associated with information to be transmitted or received based on a table that indicates absolute latency values associated with different types of services. The table may be saved at the base station 105-a and UE 115-a or may be otherwise available to the base station 105-a and UE 115-a. In other cases, base station 105-a may have access to the absolute latency values associated with different types of services (e.g., based on the table described above), and base station 105-a may signal the absolute latency values 210 corresponding to different types of services to UE 115-a.

In addition, base station 105-a and UE 115-a may also identify orders or redundancy versions to be used in transmissions in a HARQ procedure for different types of services based on a table that indicates redundancy versions associated with different types of services. The table may be saved at the base station 105-a and UE 115-a or may be otherwise available to the base station 105-a and UE 115-a. Alternatively, base station 105-a may have access to the orders of redundancy versions associated with different types of services (e.g., based on the table described above), and base station 105-a may signal the orders of the redundancy versions corresponding to different types of services to UE 115-a (e.g., via RRC signaling).

Once a transmitting device and a receiving device identifies redundancy versions associated with different types of services, these devices may be able to transmit and receive information in a HARQ procedure based on the redundancy versions. In addition, once a transmitting device and a receiving device identifies the absolute latency values associated with different types of services, these devices may be able to determine whether to retransmit information or monitor for a retransmission of the information based on the absolute latency value corresponding to a type of service associated with the information. As an example, a transmitting device may transmit information to a receiving device and may determine that the receiving device failed to successfully decode the information. Thus, the transmitting device may identify an absolute latency value corresponding to a type of service associated with the information, and the transmitting device may determine whether to retransmit the data based on the absolute latency value.

For instance, the transmitting device may identify an amount of time (or an estimate of the amount of time) that has elapsed since an original transmission of the information, and the transmitting device may determine whether to retransmit the information based on whether this amount of time (or the estimate of the amount of time) exceeds the absolute latency value or latency budget. If the transmitting device determines that the amount of time (or the estimate of the amount of time) that has elapsed since the original transmission exceeds the absolute latency value or latency budget, the transmitting device may avoid retransmitting the information to the receiving device. Otherwise, the transmitting device may retransmit the information to the receiving device.

Similarly, a receiving device may identify an amount of time (or an estimate of the amount of time) that has elapsed since an original transmission of the information, and the receiving device may determine whether to monitor for a retransmission of the information based on whether this amount of time (or the estimate of the amount of time) exceeds the absolute latency value or latency budget. If the receiving device determines that the amount of time (or the estimate of the amount of time) that has elapsed since the original transmission exceeds the absolute latency value or latency budget, the receiving device may avoid monitoring or waiting for a retransmission of the information, and the receiving device may pass the corresponding information received in previous transmissions to upper layers for processing. Otherwise, the receiving device may monitor or wait for a retransmission of the information from the transmitting device.

Figure 2B:
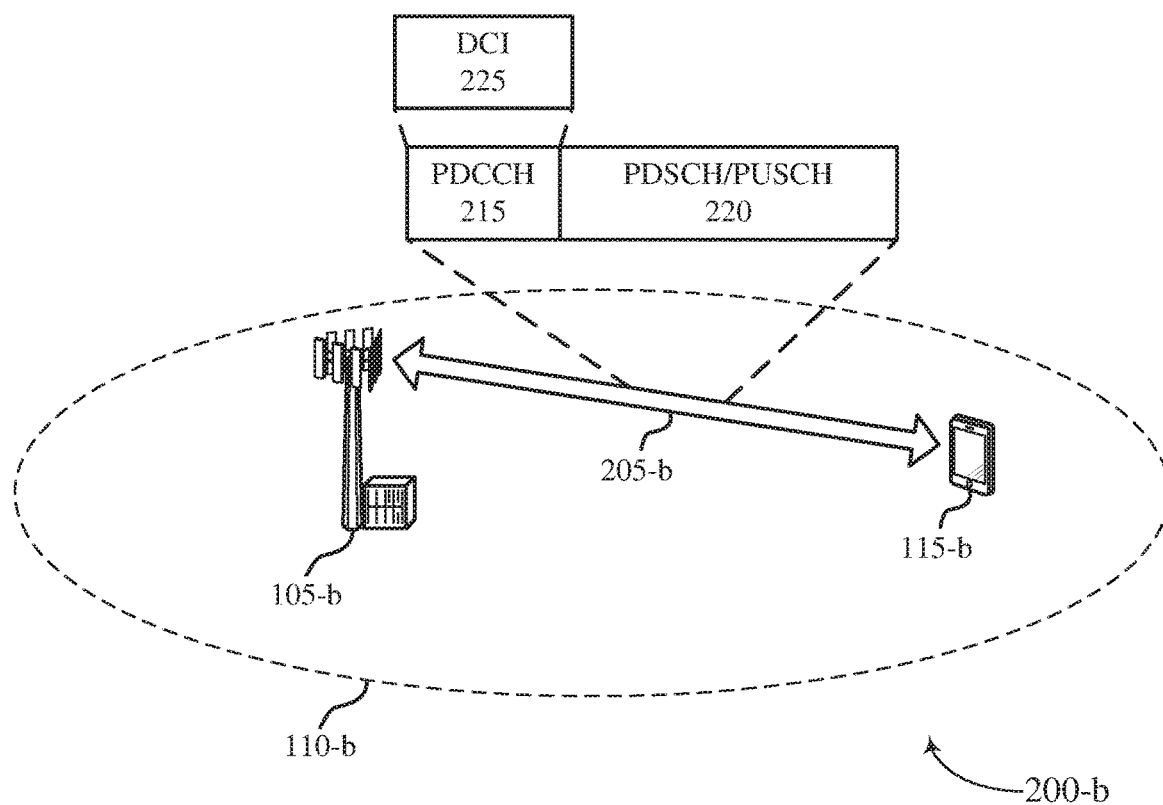

FIG. 2B illustrates an example of a wireless communications system 200-b that supports a dynamic termination of HARQ retransmissions in accordance with various aspects of the present disclosure. Wireless communications system 200-b includes base station 105-b and UE 115-b, which may be examples of the corresponding devices described with reference to FIG. 1. Base station 105-b may communicate with UEs 115 (including UE 115-b) within coverage area 110-b. For example, base station 105-b may communicate with UE 115-b on resources of a carrier 205-b. In some cases, base station 105-b may transmit DCI 225 to UE 115-b within a physical downlink control channel (PDCCH) 215. The DCI 225 may be used to schedule a downlink transmission of data in a physical downlink shared channel (PDSCH) 220 or an uplink transmission of data in a physical uplink shared channel (PUSCH) 220.

Wireless communications system 200-b may implement aspects of wireless communications system 100. For example, wireless communications system 200-b may support a HARQ scheme for communications between base station 105-b and UE 115-b. In HARQ, when a transmitting device (e.g., base station 105-b or UE 115-b) determines that a receiving device (e.g., base station 105-b or UE 115-b) failed to decode a transmission or retransmission of information, the transmitting device may retransmit the information to the receiving device. In some cases, however, after a certain number of retransmissions, an amount of time that has elapsed since an original transmission may exceed a latency budget, and another retransmission may be unnecessary and wasteful. To increase the efficiency of the HARQ scheme, the transmitting device may use the techniques described herein to determine whether to retransmit the information to the receiving device. Similarly, the receiving device may determine whether to monitor for a retransmission of the information using the techniques described herein.

Base station 105-b may schedule an uplink or downlink transmission of information using DCI 225. Base station 105-b may then determine whether a subsequent retransmission of information (i.e., after the scheduled transmission) would cause the latency of the transmissions of the information to exceed a latency budget. If base station 105-b determines that the latency of the transmissions of the information would fail to exceed the latency budget after the subsequent retransmission, base station 105-b may transmit an indication in DCI 225 that the scheduled uplink or downlink transmission is not a final transmission of the information. However, if base station 105-b determines that the latency of the transmissions of the information would exceed the latency budget after the subsequent retransmission, base station 105-b may transmit an indication in DCI 225 that the scheduled uplink or downlink transmission is a final transmission of the information.

For uplink communications, if base station 105-b indicates that a scheduled uplink transmission of information is a final transmission of the information, UE 115-b may transmit the information in the scheduled uplink transmission to base station 105-b and base station 105-b may avoid scheduling the UE 115-b for a retransmission of the information. As such, base station 105-b may process the information received in the transmission and in previous transmissions, and base station 105-b may avoid monitoring or waiting for a retransmission of the information. For downlink communications, if base station 105-b indicates that a scheduled downlink transmission of information is a final transmission of the information, base station 105-b may transmit the information in the scheduled downlink transmission to UE 115-b, and base station 105-b may avoid scheduling a retransmission of the information. As such, UE 115-b may determine that the received transmission is a final transmission of the information, process the information received in the transmission and in previous transmissions, and avoid monitoring or waiting for a retransmission of the information.

In some cases, if a latency budget corresponding to a type of service associated with information to be transmitted allows for a single transmission of the information, base station 105-b may allocate resources for the single transmission based on a BLER target associated with the type of service. In one example, if a first number of resources available for the single transmission is greater than a second number of resources to be used to satisfy the BLER target, base station 105-b may allocate the second number of resources for the single transmission such that the BLER target may be satisfied. In another example, if a first number of resources available for the single transmission is less than a second number of resources to be used to satisfy the BLER target, base station 105-b may allocate the first number of resources (i.e., all the available resources) for the single transmission (e.g., when the single transmission is prioritized over other transmissions for which resources may be allocated). In yet another example, if a first number of resources available for the single transmission is less than a second number of resources to be used to satisfy the BLER target, base station 105-*b* may allocate less resources than the first number of resources (e.g., less resources than the available resources or no resources) for the single transmission (e.g., when other transmissions for which resources may be allocated are prioritized over the single transmission). In each of the three examples described above, the base station 105-*b* may indicate that the single transmission is the final transmission of the information in DCI 225.

Figure 3:
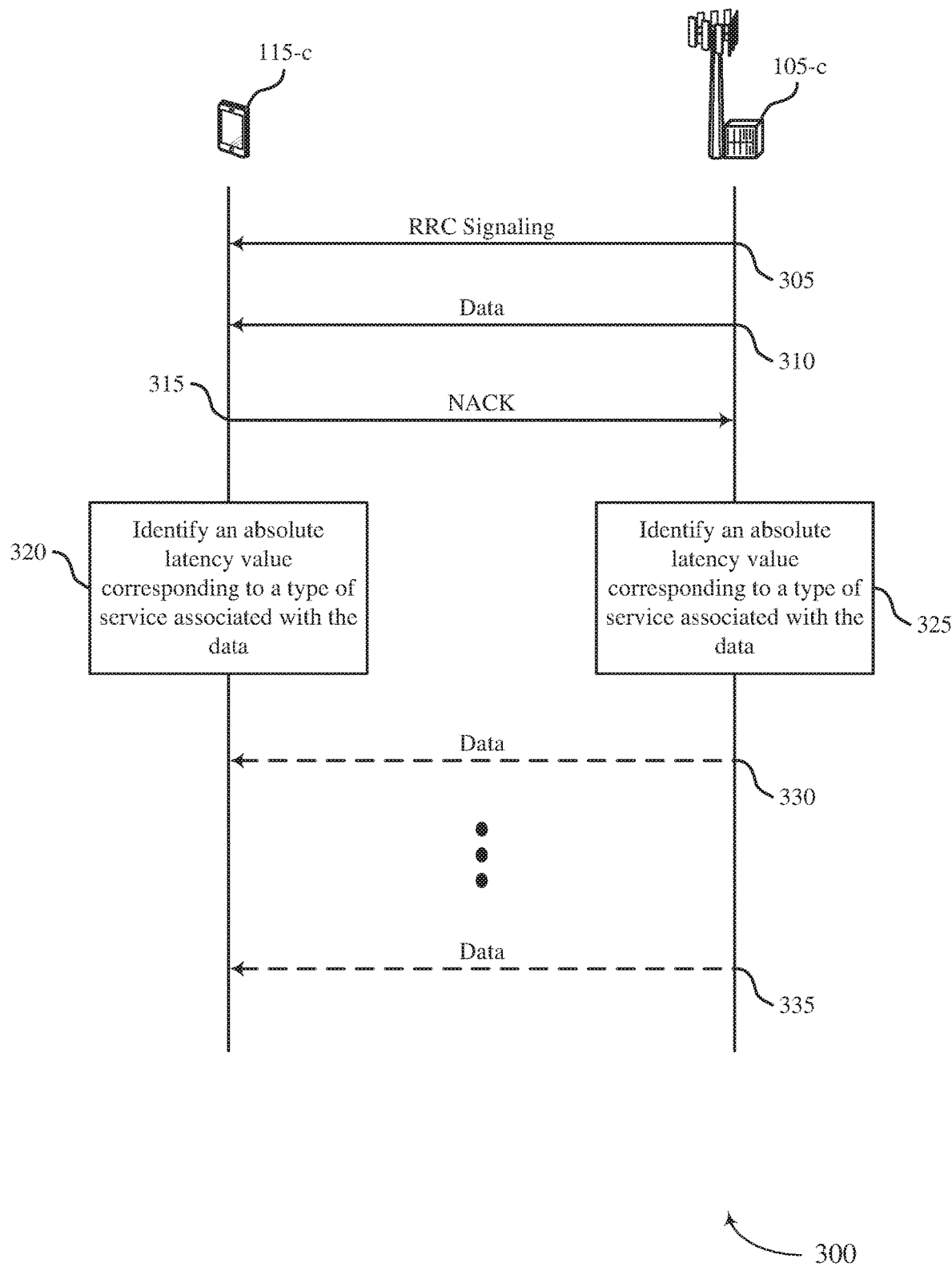
FIGS. 3 and 4 illustrate examples of process flows that support a dynamic termination of HARQ retransmissions in accordance with aspects of the present disclosure.

FIG. 3 illustrates an example of a process flow 300 that supports a dynamic termination of HARQ retransmissions in accordance with various aspects of the present disclosure. Process flow 300 illustrates aspects of techniques performed by base station 105-*c*, which may be an example of a base station 105 described with reference to FIGS. 1 and 2A. Process flow 300 also illustrates aspects of techniques performed by a UE 115-*c*, which may be an example of a UE 115 described with reference to FIGS. 1 and 2A.

At 305, base station 105-*c* may transmit RRC signaling to UE 115-*c* to configure UE 115-*c* for communications with the base station 105-*c* (e.g., to provide configurations for control and data channels). In some cases, the RRC signaling may indicate absolute latency values corresponding to different types of services (e.g., eMBB services, MTC services, and different types of low latency services). At 310, base station 105-*c* may transmit data to UE 115-*c*, and UE 115-*c* may receive the data from base station 105-*c*. UE 115-*c* may attempt and fail to decode the data, and, at 315, UE 115-*c* may transmit a NACK to base station 105-*c* to indicate that the UE 115-*c* was not able to successfully decode the data. Thus, in the example of FIG. 3, base station 105-*c* may receive the NACK and determine that UE 115-*c* failed to decode the data. In other examples, however, base station 105-*c* may determine that UE 115-*c* failed to decode the data based on failing to receive HARQ feedback for the data transmitted at 310.

After transmitting the NACK, UE 115-*c* may use the techniques described herein to determine whether to monitor for a retransmission of the data or to avoid monitoring for the retransmission and pass the data received at 310 to higher layers for processing. In particular, at 320, UE 115-*c* may identify an absolute latency value corresponding to a type of service associated with the data received at 310, and UE 115-*c* may determine whether to monitor for a retransmission of the data based on the absolute latency value. UE 115-*c* may identify the absolute latency value corresponding to the type of service based on an indication of the absolute latency value in the RRC signaling received at 305 or based on a table (e.g., available to the UE 115-*c*) that indicates absolute latency values corresponding to different types of services.

If UE 115-*c* determines that a latency value associated with one or more transmissions of the data (e.g., at 310) has exceeded the absolute latency value, UE 115-*c* may pass the data received at 310 to higher layers for processing and avoid monitoring for the retransmission of the data. But if UE 115-*c* determines that the latency value associated with the one or more transmissions of the data fails to exceed the absolute latency value, UE 115-*c* may monitor for the retransmission of the data. The latency value associated with the one or more transmissions of the data may correspond to an amount of time (or an estimate of the amount of time) that has elapsed since the original transmission of the data.

Similarly, after receiving the NACK, base station 105-*c* may use the techniques described herein to determine whether to retransmit the data or avoid retransmitting the data to UE 115-*c*. In particular, at 325, base station 105-*c* may identify an absolute latency value corresponding to a type of service associated with the data transmitted at 310, and base station 105-*c* may determine whether to retransmit the data based on the absolute latency value. Base station 105-*c* may identify the absolute latency value corresponding to the type of service based on a table (e.g., available to the base station 105-*c*) that indicates absolute latency values corresponding to different types of services.

If base station 105-*c* determines that a latency value associated with one or more transmissions of the data (e.g., at 310) has exceeded the absolute latency value, base station 105-*c* may avoid retransmitting the data to UE 115-*c*. But if base station 105-*c* determines that the latency value associated with the one or more transmissions of the data fails to exceed the absolute latency value, base station 105-*c* may retransmit the data to UE 115-*c*. The latency value associated with the one or more transmissions of the data may correspond to an amount of time (or an estimate of the amount of time) that has elapsed since the original transmission of the data.

In some cases, base station 105-*c* may determine to retransmit the data to UE 115-*c*, and, at 330, base station 105-*c* may retransmit the data to UE 115-*c*. Similarly, UE 115-*c* may determine to monitor or wait for a retransmission of the data from base station 105-*c*, and, at 330, UE 115-*c* may receive the retransmission of the data from base station 105-*c*. The above techniques may be repeated (e.g., including another retransmission of the data at 335) until a latency (e.g., the latency value) of the transmissions of the data exceeds the latency requirement (e.g., the absolute latency value corresponding to a type of service associated with the data). In such cases, base station 105-*c* may avoid retransmitting the data to UE 115-*c*, and UE 115-*c* may avoid monitoring or waiting for the retransmission.

Because base station 105-*c* may determine whether to retransmit data to UE 115-*c* based on the absolute latency value or the latency budget (e.g., rather than a fixed maximum number of retransmissions), the maximum number of retransmissions of the data may be determined dynamically, and base station 105-*c* may be able to provide a maximum number of retransmissions within a latency budget. Similarly, because UE 115-*c* may determine whether to monitor or wait for a retransmission of data from base station 105-*c* based on the absolute latency value or the latency budget (e.g., rather than a fixed maximum number of retransmissions), the maximum number of retransmissions of the data may be determined dynamically, and UE 115-*c* may be able to receive a maximum number of retransmissions within a latency budget. Thus, the techniques described above may facilitate an efficient use of resources as a maximum number of retransmissions within a latency budget may be provided to attempt to satisfy a BLER target while avoiding unnecessary retransmissions.

Although the techniques described are directed to downlink data transmissions, it is to be understood that the same techniques may be applied for uplink data transmissions. For example, UE 115-*c* may determine whether to retransmit data to base station 105-*c* based on an absolute latency value corresponding to a type of service associated with the data, and base station 105-*c* may determine whether to monitor for a retransmission of the data based on the absolute latency value. As described herein, monitoring for a retransmission of data may include waiting to receive the retransmission of the data to combine (e.g., soft combine) the retransmitted data with previously received data as part of a HARQ procedure.

Figure 4:
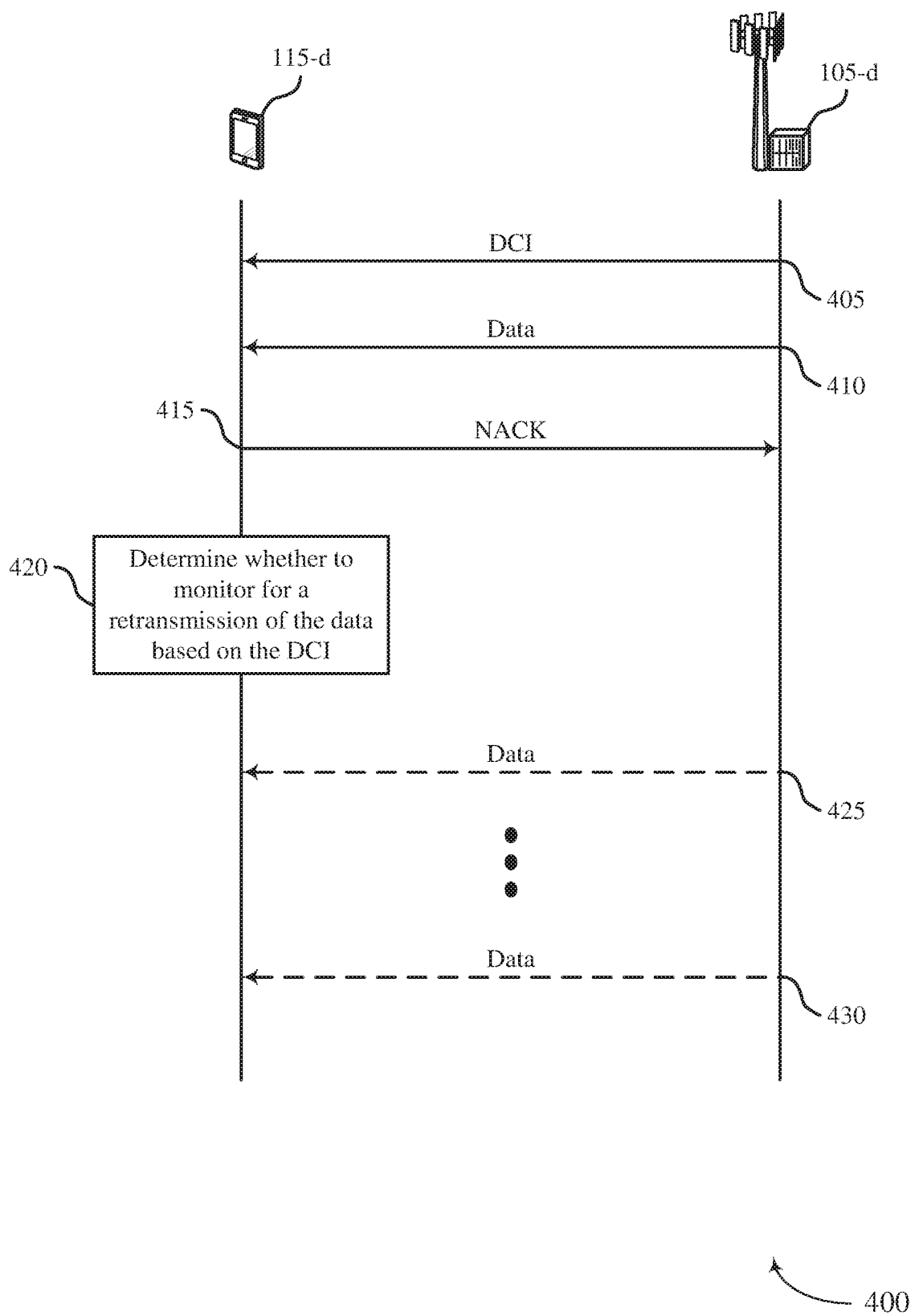

FIG. 4 illustrates an example of a process flow 400 that supports a dynamic termination of HARQ retransmissions in accordance with various aspects of the present disclosure. Process flow 400 illustrates aspects of techniques performed by base station 105-d, which may be an example of a base station 105 described with reference to FIGS. 1 and 2B. Process flow 400 also illustrates aspects of techniques performed by a UE 115-d, which may be an example of a UE 115 described with reference to FIGS. 1 and 2B.

At 405, base station 105-d may transmit DCI to UE 115-d to schedule the UE 115-d for a downlink transmission of data (e.g., to allocate resources for UE 115-d to monitor for the downlink transmission). In some cases, the DCI may also indicate (e.g., using a single bit) whether the scheduled transmission is a final transmission of the data. For example, a base station 105-d may determine that further retransmissions of the data after the scheduled transmission would cause the base station 105-d to exceed a latency budget. As such, the base station 105-d may determine to avoid further retransmissions of the data, and the base station 105-d may transmit an indication that the scheduled transmission is a final transmission of the data. Otherwise, base station 105-d may transmit an indication that the scheduled transmission is not a final transmission of the data, and the base station 105-a may potentially retransmit the data to UE 115-d.

At 410, base station 105-d may transmit the data to UE 115-d, and UE 115-d may receive the data from base station 105-d. UE 115-d may attempt and fail to decode the data, and, at 415, UE 115-d may transmit a NACK to base station 105-d to indicate that the UE 115-d was not able to successfully decode the data. Thus, in the example of FIG. 4, base station 105-d may receive the NACK and determine that UE 115-d failed to decode the data. In other examples, however, base station 105-d may determine that UE 115-d failed to decode the data based on failing to receive HARQ feedback for the data transmitted at 410.

After transmitting the NACK, UE 115-d may use the techniques described herein to determine whether to monitor for a retransmission of the data or to avoid monitoring for the retransmission and pass the data received at 410 to higher layers for processing. In particular, at 420, UE 115-d may determine whether the transmission of the data at 410 was the final transmission of the data based on the indication in the DCI, and UE 115-d may determine whether to monitor for a retransmission of the data based on the determination. If UE 115-d determines that the DCI indicated that the transmission of the data at 410 was the final transmission, UE 115-d may pass the data received at 410 to higher layers for processing, and UE 115-d may avoid monitoring for the retransmission. Otherwise, UE 115-d may wait for a retransmission of the data.

In some cases, base station 105-d may determine to retransmit the data to UE 115-d, and, at 425, base station 105-d may retransmit the data to UE 115-d. Similarly, UE 115-d may determine to monitor or wait for a retransmission of the data from base station 105-d, and, at 425, UE 115-d may receive the retransmission of the data from base station 105-d. The above techniques may be repeated (e.g., including another retransmission of the data at 430) until base station 105-d determines that a retransmission of data following a scheduled transmission of the data would exceed a latency budget. In such cases, the base station 105-d may indicate that a scheduled transmission of data is a final transmission of the data. Specifically, the base station 105-c may transmit the indication of whether the scheduled transmission of the data is a final transmission of the data in the DCI used to schedule the transmission.

Because the indication of whether a transmission of data is a final transmission of the data is transmitted in the DCI, the maximum number of retransmissions of the data may be determined dynamically, and base station 105-d may be able to provide a maximum number of retransmissions within a latency budget. For example, base station 105-d may determine whether a retransmission of the data after a scheduled transmission would exceed a latency budget (e.g., based on an estimate of the latency after the retransmission), and base station 105-d may transmit an indication of whether the scheduled transmission is a final transmission based on the determination. Thus, the techniques described above may facilitate an efficient use of resources as a maximum number of retransmissions within a latency budget may be provided to attempt to satisfy a BLER target while avoiding unnecessary retransmissions.

Although the techniques described above are directed to downlink data transmissions, it is to be understood that the same techniques may be applied for uplink data transmissions. For example, UE 115-c may determine whether a scheduled uplink transmission is a final transmission of the data based on an indication in the DCI that schedules the uplink transmission. If the DCI indicates that the scheduled uplink transmission is a final transmission, UE 115-c may avoid retransmitting the data after the scheduled transmission, and base station 105-d may avoid monitoring for the data after the scheduled transmission. As described herein, monitoring for a retransmission of data may include waiting to receive the retransmission of the data to combine (e.g., soft combine) the retransmitted data with previously received data as part of a HARQ procedure.

Figure 5:
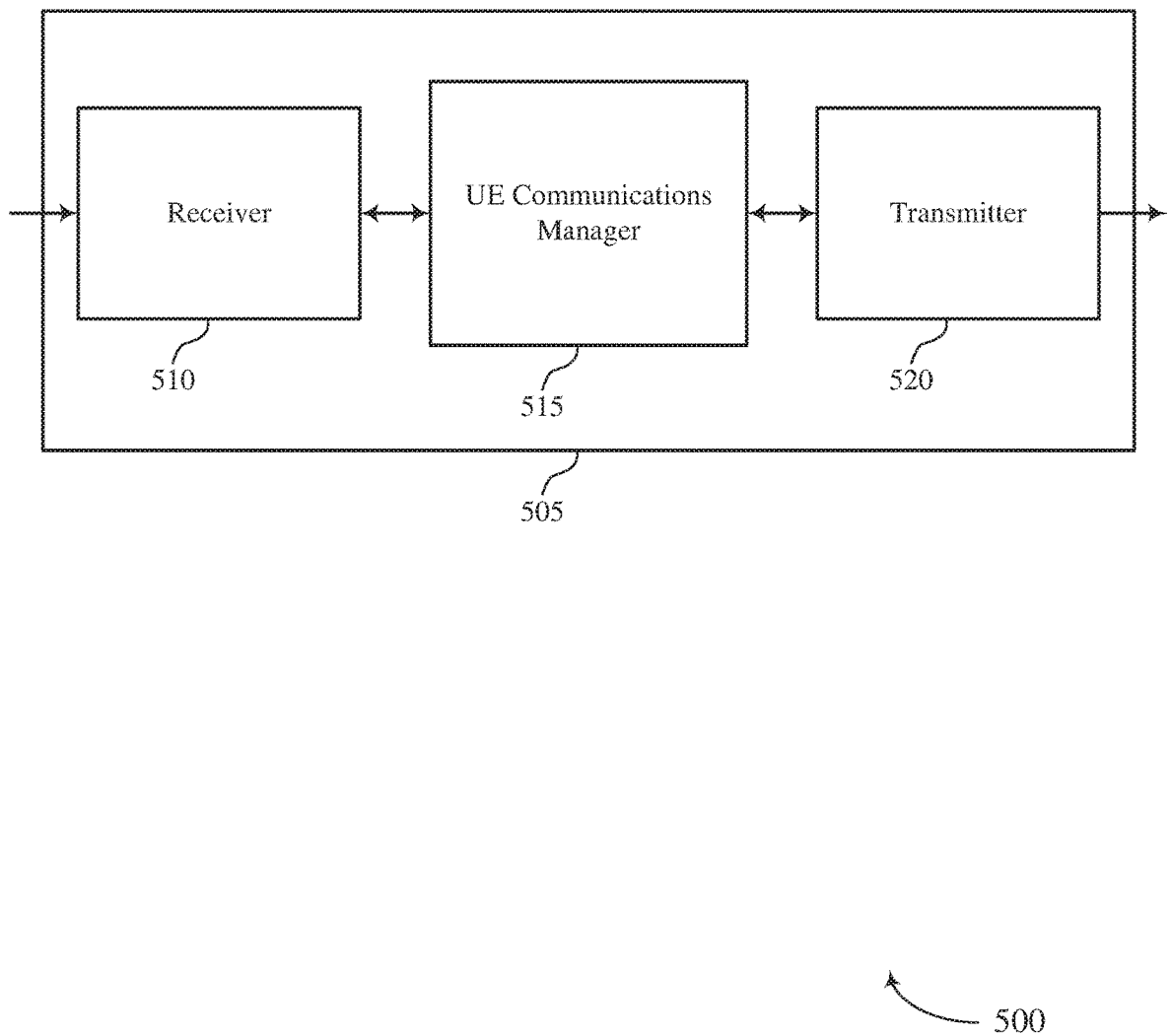
FIGS. 5 and 6 show block diagrams of a device that supports a dynamic termination of HARQ retransmissions in accordance with aspects of the present disclosure.

FIG. 5 shows a block diagram 500 of a wireless device 505 that supports a dynamic termination of HARQ retransmissions in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to a dynamic termination of HARQ retransmissions, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some aspects, receiver 510 may receive data from a base station, the data associated with a type of service. UE communications manager 515 may transmit, to the base station, an indication that decoding of the data was unsuccessful, identify an absolute latency value based on transmitting the indication, the absolute latency value corresponding to the type of service associated with the data, and monitor or avoid monitoring for a retransmission of the data from the base station based on the identified absolute latency value.

In other aspects, transmitter 520 may transmit data to a base station, the data associated with a type of service. The UE communications manager 515 may determine that the base station failed to successfully decode the data, identify an absolute latency value based on the determining, the absolute latency value corresponding to the type of service that is associated with the data, and retransmit or avoid retransmitting the data to the base station based on the identified absolute latency value.

In yet other aspects, the UE communications manager 515 may receive DCI that schedules an uplink or downlink transmission of data and receive, in the DCI, an indication of whether the uplink or downlink transmission is a final transmission of the data. Transmitter 520 may then transmit the data in the uplink transmission or receiver 510 may receive the data in the downlink transmission based on the DCI.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
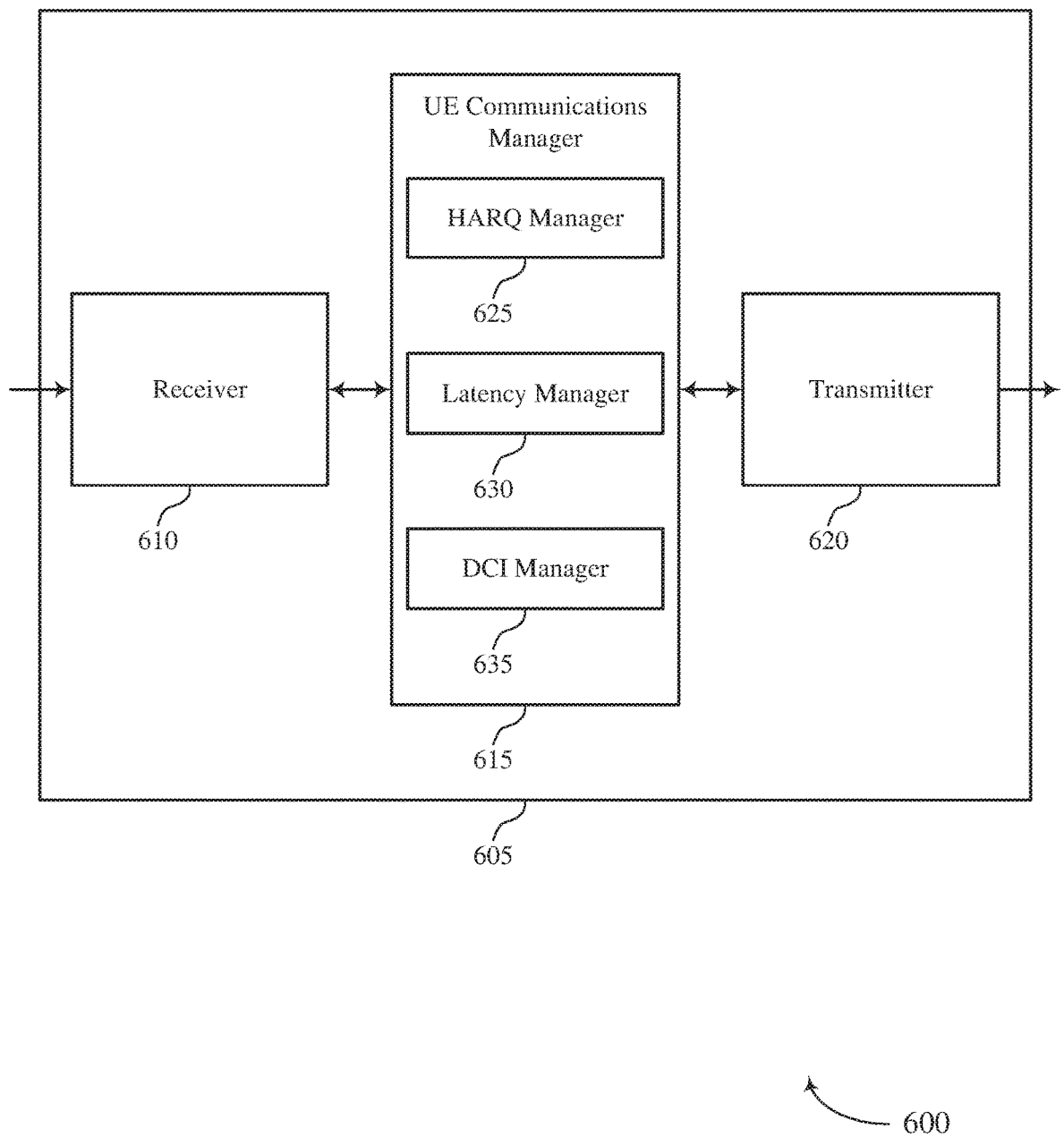

FIG. 6 shows a block diagram 600 of a wireless device 605 that supports dynamic termination of HARQ retransmissions in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to dynamic termination of HARQ retransmissions, etc.). Information may be passed on to other components of the device. The receiver 610 may be an example of aspects of the transceiver 735 described with reference to FIG. 7. The receiver 610 may utilize a single antenna or a set of antennas.

UE communications manager 615 may be an example of aspects of the UE communications manager 715 described with reference to FIG. 7. UE communications manager 615 may include HARQ manager 625, latency manager 630, and DCI manager 635.

In some aspects, receiver 610 may receive data from a base station, the data associated with a type of service. HARQ manager 625 may transmit, to the base station, an indication that decoding of the data was unsuccessful. Latency manager 630 may identify an absolute latency value based on transmitting the indication, the absolute latency value corresponding to the type of service associated with the data. HARQ manager 625 may monitor or avoid monitoring for a retransmission of the data from the base station based on the identified absolute latency value.

In some cases, latency manager 630 may receive RRC signaling that indicates the absolute latency value corresponding to the type of service that is associated with the data, where the absolute latency value is identified based on the RRC signaling. In other cases, latency manager 630 may identify the absolute latency value based on a table that indicates absolute latency values corresponding to different types of services. In some cases, a maximum number of retransmissions of the data is based on the absolute latency value corresponding to the type of service associated with the data.

In some cases, latency manager 630 may determine that a latency value associated with one or more transmissions of the data fails to exceed the absolute latency value. In such cases, HARQ manager 625 may monitor for the retransmission of the data from the base station based on the determining. In other cases, latency manager 630 may determine that a latency value associated with one or more transmissions of the data has exceeded the absolute latency value. In such cases, HARQ manager 625 may avoid monitoring for the retransmission of the data from the base station based on the determining.

In other aspects, transmitter 620 may transmit data to a base station, the data associated with a type of service. HARQ manager 625 may determine that the base station failed to successfully decode the data. In some cases, determining that the base station failed to successfully decode the data includes receiving, from the base station, an indication that decoding of the data was unsuccessful. Latency manager 630 may identify an absolute latency value based on the determining, the absolute latency value corresponding to the type of service that is associated with the data. HARQ manager 625 may retransmit or avoid retransmitting the data to the base station based on the identified absolute latency value.

In some cases, latency manager 630 may receive RRC signaling that indicates the absolute latency value corresponding to the type of service that is associated with the data, where the absolute latency value is identified based on the RRC signaling. Latency manager 630 may identify the absolute latency value based on a table that indicates absolute latency values corresponding to different types of services. In some cases, a maximum number of retransmissions of the data is based on the absolute latency value corresponding to the type of service associated with the data.

In some cases, latency manager 630 may determine that a latency value associated with one or more transmissions of the data fails to exceed the absolute latency value. In such cases, HARQ manager 625 may retransmit the data to the base station based on the determining. In other cases, latency manager 630 may determine that a latency value associated with one or more transmissions of the data has exceeded the absolute latency value. In such cases, HARQ manager 625 may avoid retransmitting the data to the base station based on the determining.

In yet other aspects, DCI manager 635 may receive DCI that schedules an uplink or downlink transmission of data. DCI manager 635 may receive, in the DCI, an indication of whether the uplink or downlink transmission is a final transmission of the data. Transmitter 620 may then transmit the data in the uplink transmission or receiver 610 may receive the data in the downlink transmission based on the DCI. In some cases, an amount of resources allocated for the uplink transmission or the downlink transmission is based on a BLER target of a type of service associated with the data. In some cases, the amount of resources allocated for the uplink transmission or the downlink transmission is further based on an amount of resources available for the uplink transmission or the downlink transmission.

Transmitter 620 may transmit signals generated by other components of the device. In some examples, the transmitter 620 may be collocated with a receiver 610 in a transceiver module. For example, the transmitter 620 may be an example of aspects of the transceiver 735 described with reference to FIG. 7. The transmitter 620 may utilize a single antenna or a set of antennas.

Figure 7:
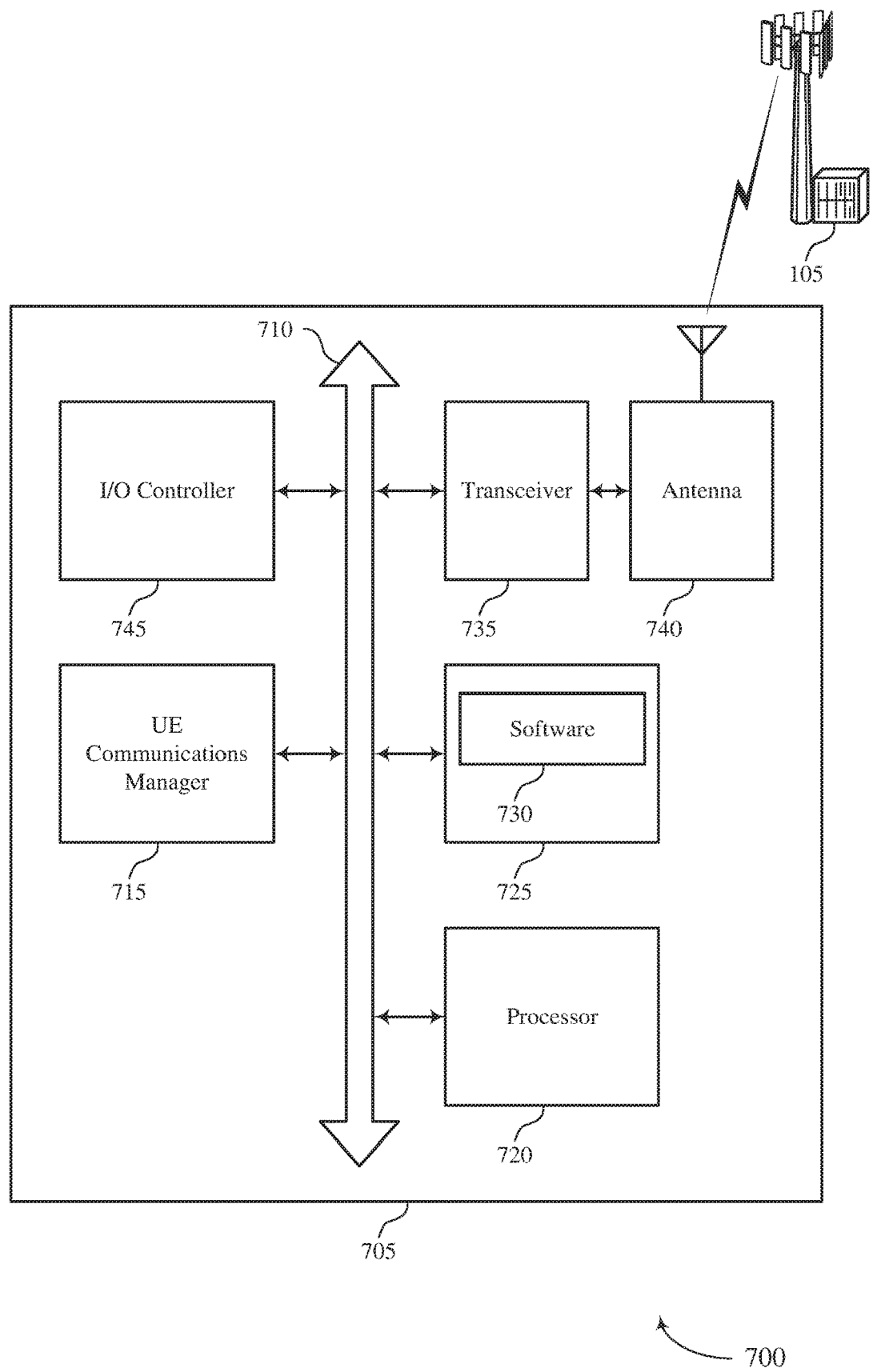
FIG. 7 illustrates a block diagram of a system including a user equipment (UE) that supports a dynamic termination of HARQ retransmissions in accordance with aspects of the present disclosure.

FIG. 7 shows a diagram of a system 700 including a device 705 that supports dynamic termination of HARQ retransmissions in accordance with aspects of the present disclosure. Device 705 may be an example of or include the components of wireless device 505, wireless device 605, or a UE 115 as described above, e.g., with reference to FIGS. 5 and 6. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting dynamic termination of HARQ retransmissions).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support dynamic termination of HARQ retransmissions. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
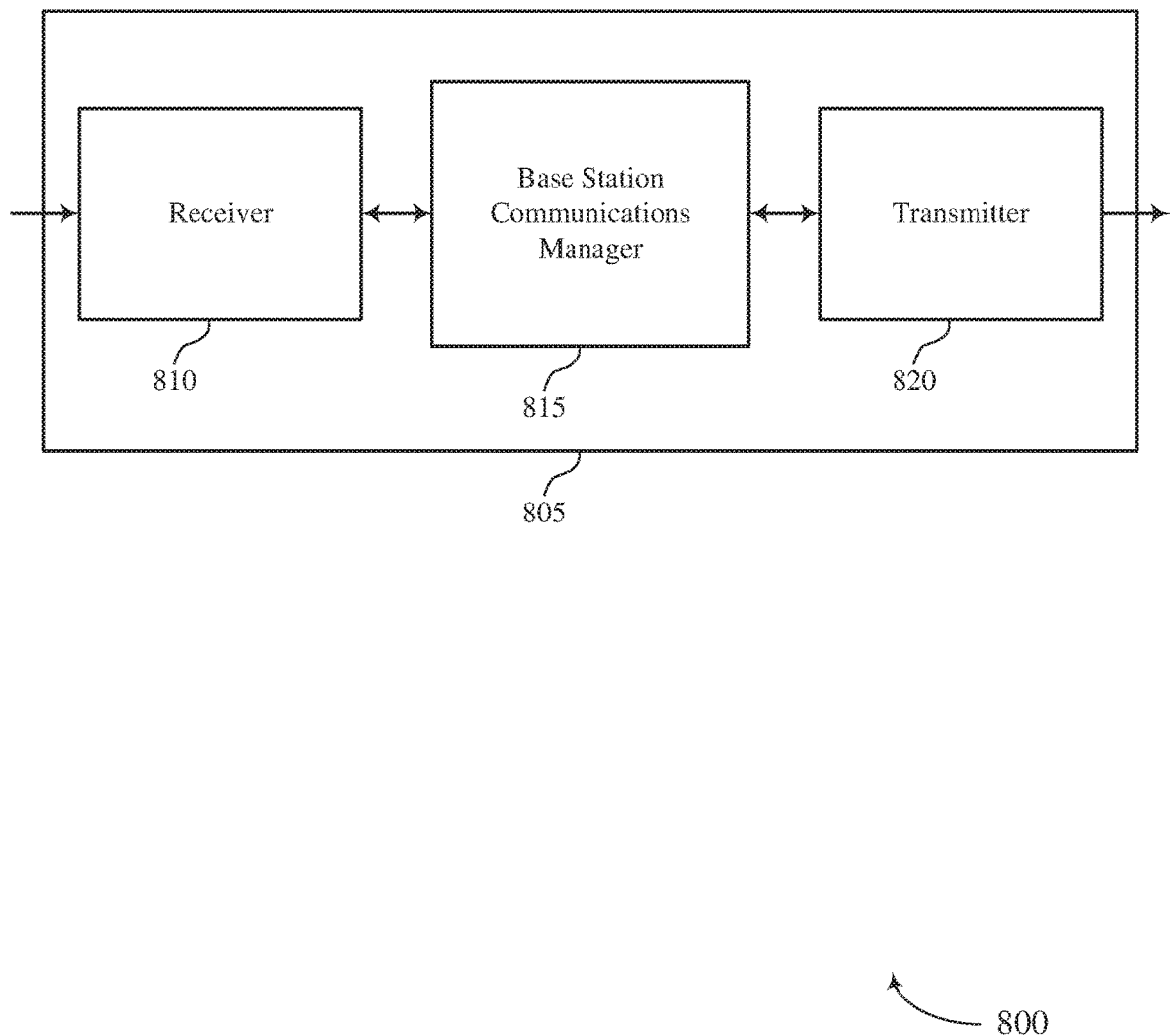
FIGS. 8 and 9 show block diagrams of a device that supports a dynamic termination of HARQ retransmissions in accordance with aspects of the present disclosure.

FIG. 8 shows a block diagram 800 of a wireless device 805 that supports dynamic termination of HARQ retransmissions in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to dynamic termination of HARQ retransmissions, etc.). Information may be passed on to other components of the device. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some aspects, receiver 810 may receive data from a UE, the data associated with a type of service. Base station communications manager 815 may transmit, to the UE, an indication that decoding of the data was unsuccessful, identify an absolute latency value based on transmitting the indication, the absolute latency value corresponding to the type of service associated with the data, and monitor or avoid monitoring for a retransmission of the data from the UE based on the identified absolute latency value.

In other aspects, transmitter 820 may transmit data to a UE, the data associated with a type of service. The base station communications manager 815 may determine that the UE failed to successfully decode the data, identify an absolute latency value based on the determining, the absolute latency value corresponding to the type of service that is associated with the data, and retransmit or avoid retransmitting the data to the UE based on the identified absolute latency value.

In yet other aspects, the base station communications manager 815 may transmit DCI that schedules an uplink or downlink transmission of data and transmit, in the DCI, an indication of whether the uplink or downlink transmission is a final transmission of the data. Transmitter 820 may then transmit the data in the downlink transmission or receiver 810 may receive the data in the uplink transmission based on the DCI.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
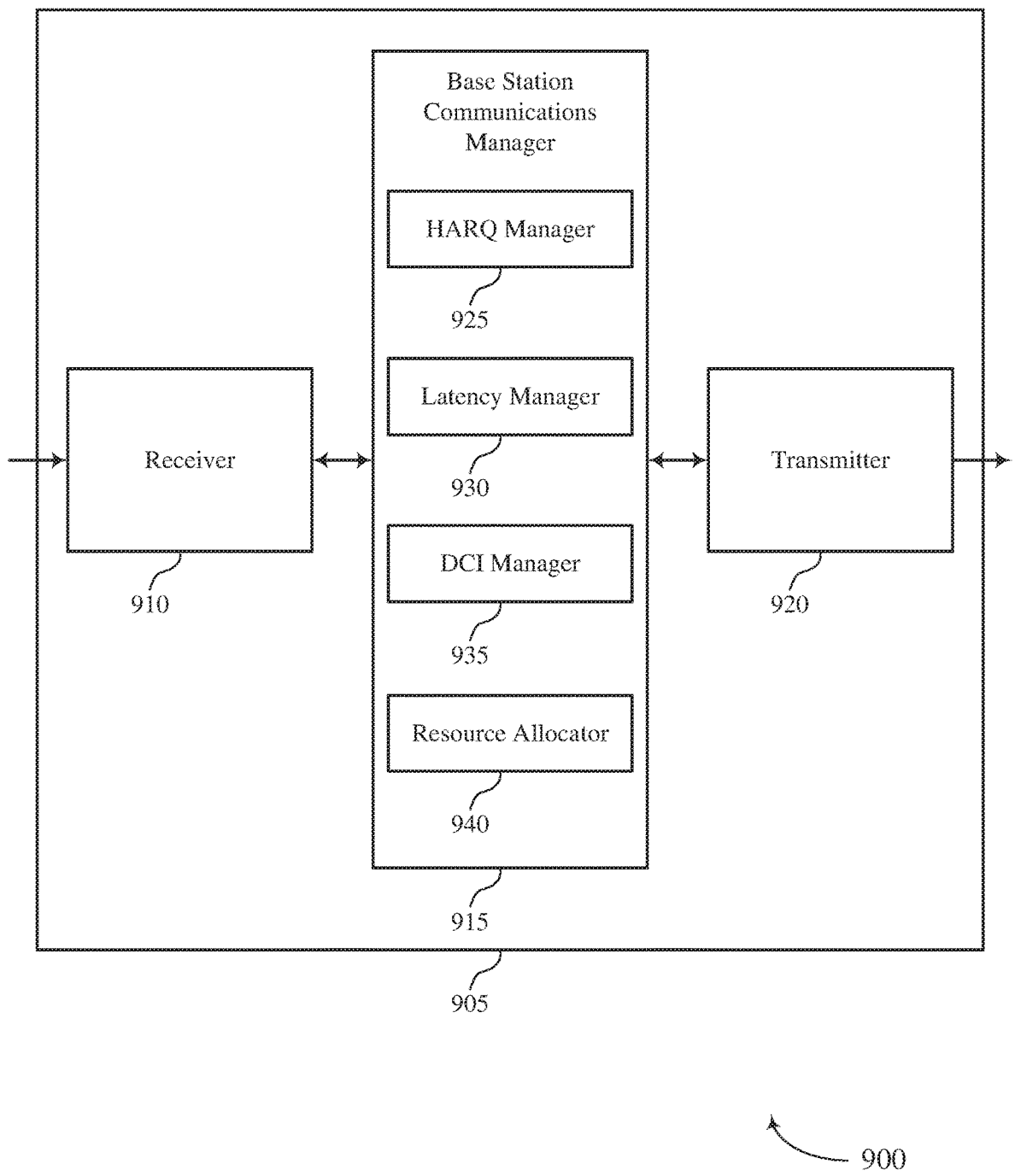

FIG. 9 shows a block diagram 900 of a wireless device 905 that supports dynamic termination of HARQ retransmissions in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to dynamic termination of HARQ retransmissions, etc.). Information may be passed on to other components of the device. The receiver 910 may be an example of aspects of the transceiver 1035 described with reference to FIG. 10. The receiver 910 may utilize a single antenna or a set of antennas.

Base station communications manager 915 may be an example of aspects of the base station communications manager 1015 described with reference to FIG. 10. Base station communications manager 915 may include HARQ manager 925, latency manager 930, DCI manager 935, and resource allocator 940.

In some aspects, receiver 910 may receive data from a UE, the data associated with a type of service. HARQ manager 925 may transmit, to the UE, an indication that decoding of the data was unsuccessful. Latency manager 930 may identify an absolute latency value based on transmitting the indication, the absolute latency value corresponding to the type of service associated with the data. In some cases, latency manager 930 may identify the absolute latency value based on a table that indicates absolute latency values corresponding to different types of services. HARQ manager 925 may monitor or avoid monitoring for a retransmission of the data from the UE based on the identified absolute latency value.

In some cases, latency manager 930 may determine that a latency value associated with one or more transmissions of the data fails to exceed the absolute latency value. In such cases, HARQ manager 925 may monitor for the retransmission of the data from the UE based on the determining. In other cases, latency manager 930 may determine that a latency value associated with one or more transmissions of the data has exceeded the absolute latency value. In such cases, HARQ manager 925 may avoid monitoring for the retransmission of the data from the UE based on the determining. In some cases, a maximum number of retransmissions of the data is based on the absolute latency value corresponding to the type of service associated with the data.

In other aspects, transmitter 920 may transmit data to a UE, the data associated with a type of service. HARQ manager 925 may determine that the UE failed to successfully decode the data. In some cases, determining that the UE failed to successfully decode the data includes receiving, from the UE, an indication that decoding of the data was unsuccessful. Latency manager 930 may identify an absolute latency value based on the determining, the absolute latency value corresponding to the type of service that is associated with the data. In some cases, latency manager 930 may identify the absolute latency value based on a table that indicates absolute latency values corresponding to different types of services. HARQ manager 925 may retransmit or avoid retransmitting the data to the UE based on the identified absolute latency value.

In some cases, latency manager 930 may determine that a latency value associated with one or more transmissions of the data fails to exceed the absolute latency value. In such cases, HARQ manager 925 may retransmit the data to the UE based on the determining. In other cases, latency manager 930 may determine that a latency value associated with one or more transmissions of the data has exceeded the absolute latency value. In such cases, HARQ manager 925 may avoid retransmitting the data to the UE based on the determining. In some cases, a maximum number of retransmissions of the data is based on the absolute latency value corresponding to the type of service associated with the data.

In yet other aspects, DCI manager 935 may transmit DCI that schedules an uplink or downlink transmission of data and transmit, in the DCI, an indication of whether the uplink or downlink transmission is a final transmission of the data. Transmitter 920 may then transmit the data in the downlink transmission or receiver 910 may receive the data in the uplink transmission based on the DCI.

Resource allocator 940 may determine a BLER target of a type of service associated with the data, and resource allocator 940 may allocate resources for the final transmission based on the BLER target. In one example, resource allocator 940 may identify a first amount of resources to be used for the final transmission to satisfy the BLER target, determine that a second amount of resources available for the final transmission is greater than or equal to the first amount of resources, and allocate the first amount of resources for the final transmission. In another example, resource allocator 940 may identify a first amount of resources to be used for the final transmission to satisfy the BLER target, determine that a second amount of resources available for the final transmission is less than the first amount of resources, and allocate the second amount of resources for the final transmission. In yet another example, resource allocator 940 may identify a first amount of resources to be used for the final transmission to satisfy the BLER target, determine that a second amount of resources available for the final transmission is less than the first amount of resources, and allocate less resources than the second amount of resources for the final transmission.

Transmitter 920 may transmit signals generated by other components of the device. In some examples, the transmitter 920 may be collocated with a receiver 910 in a transceiver module. For example, the transmitter 920 may be an example of aspects of the transceiver 1035 described with reference to FIG. 10. The transmitter 920 may utilize a single antenna or a set of antennas.

Figure 10:
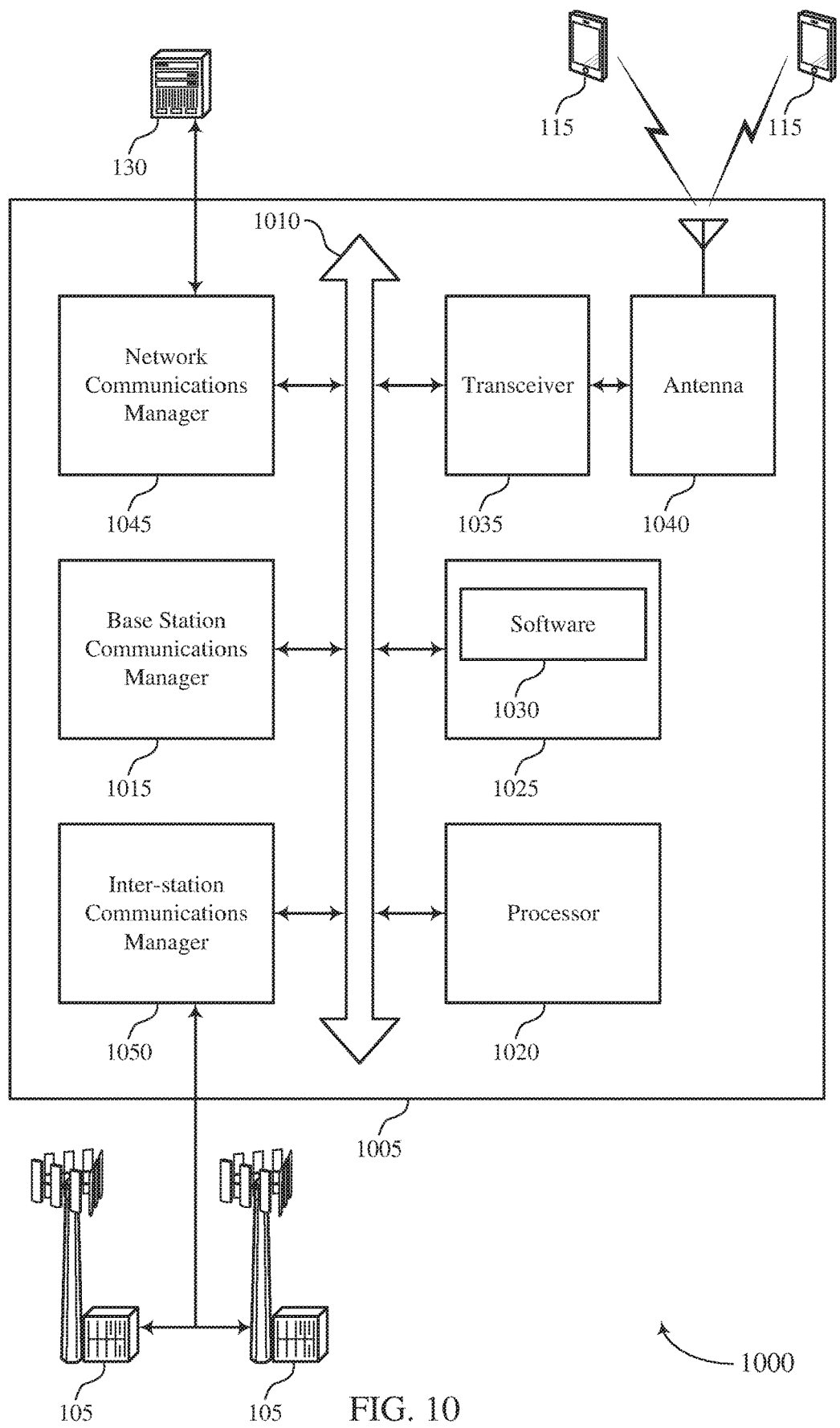
FIG. 10 illustrates a block diagram of a system including a base station that supports a dynamic termination of HARQ retransmissions in accordance with aspects of the present disclosure.

FIG. 10 shows a diagram of a system 1000 including a device 1005 that supports dynamic termination of HARQ retransmissions in accordance with aspects of the present disclosure. Device 1005 may be an example of or include the components of base station 105 as described above, e.g., with reference to FIG. 1. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting dynamic termination of HARQ retransmissions).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support dynamic termination of HARQ retransmissions. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
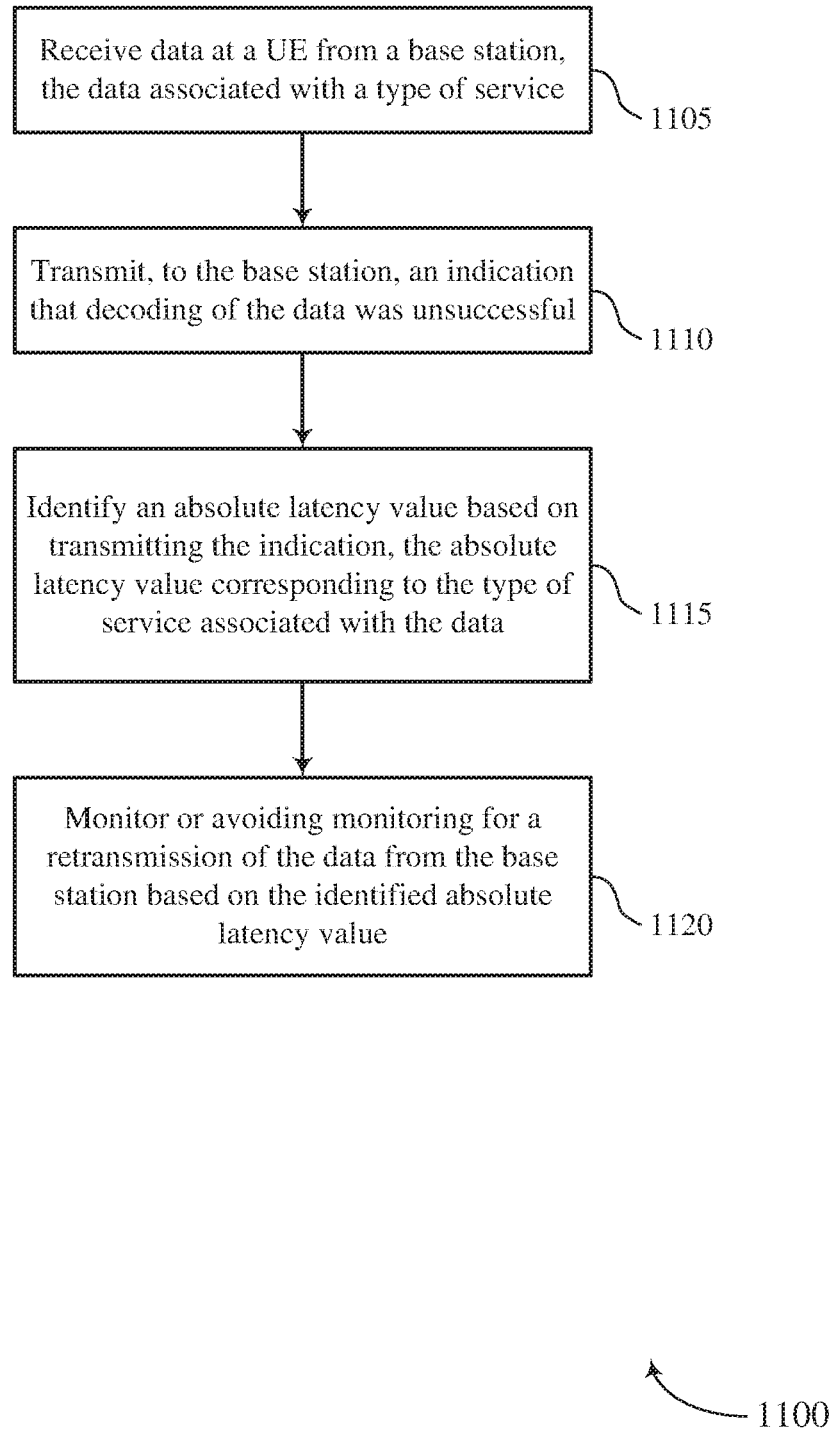
FIGS. 11-16 illustrate methods for a dynamic termination of HARQ retransmissions in accordance with aspects of the present disclosure.

FIG. 11 shows a flowchart illustrating a method 1100 for dynamic termination of HARQ retransmissions in accordance with aspects of the present disclosure. The operations of method 1100 may be implemented by a UE 115 or its components as described herein. For example, the operations of method 1100 may be performed by a UE communications manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At 1105 the UE 115 may receive data at a UE from a base station, the data associated with a type of service. The operations of 1105 may be performed according to the methods described herein. In certain examples, aspects of the operations of 1105 may be performed by a receiver as described with reference to FIGS. 5 through 7.

At 1110 the UE 115 may transmit, to the base station, an indication that decoding of the data was unsuccessful. The operations of 1110 may be performed according to the methods described herein. In certain examples, aspects of the operations of 1110 may be performed by a HARQ manager as described with reference to FIGS. 5 through 7.

At 1115 the UE 115 may identify an absolute latency value based at least in part on transmitting the indication, the absolute latency value corresponding to the type of service associated with the data. The operations of 1115 may be performed according to the methods described herein. In certain examples, aspects of the operations of 1115 may be performed by a latency manager as described with reference to FIGS. 5 through 7.

At 1120 the UE 115 may monitor or avoiding monitoring for a retransmission of the data from the base station based at least in part on the identified absolute latency value. The operations of 1120 may be performed according to the methods described herein. In certain examples, aspects of the operations of 1120 may be performed by a HARQ manager as described with reference to FIGS. 5 through 7.

Figure 12:
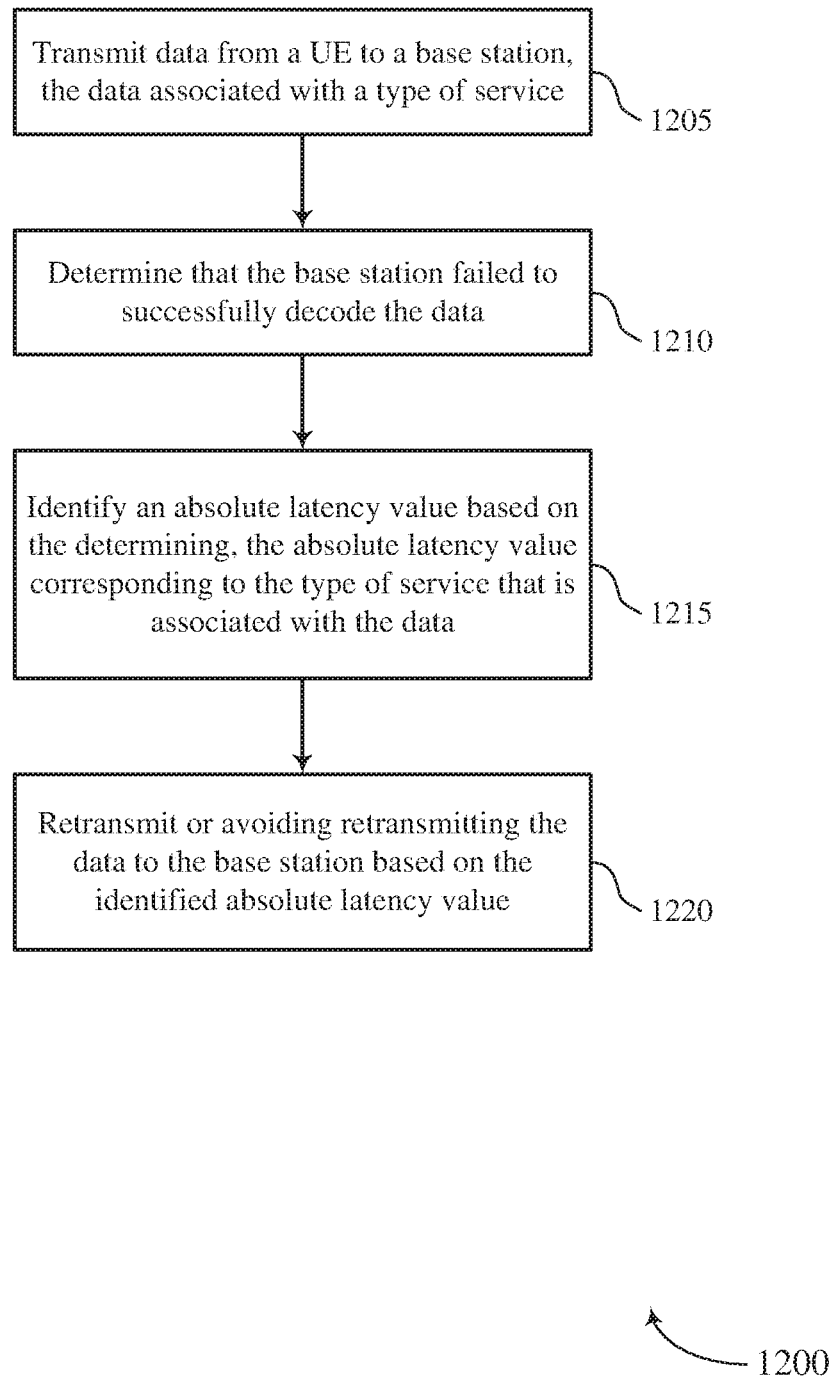

FIG. 12 shows a flowchart illustrating a method 1200 for dynamic termination of HARQ retransmissions in accordance with aspects of the present disclosure. The operations of method 1200 may be implemented by a UE 115 or its components as described herein. For example, the operations of method 1200 may be performed by a UE communications manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At 1205 the UE 115 may transmit data from a UE to a base station, the data associated with a type of service. The operations of 1205 may be performed according to the methods described herein. In certain examples, aspects of the operations of 1205 may be performed by a transmitter as described with reference to FIGS. 5 through 7.

At 1210 the UE 115 may determine that the base station failed to successfully decode the data. The operations of 1210 may be performed according to the methods described herein. In certain examples, aspects of the operations of 1210 may be performed by a HARQ manager as described with reference to FIGS. 5 through 7.

At 1215 the UE 115 may identify an absolute latency value based at least in part on the determining, the absolute latency value corresponding to the type of service that is associated with the data. The operations of 1215 may be performed according to the methods described herein. In certain examples, aspects of the operations of 1215 may be performed by a latency manager as described with reference to FIGS. 5 through 7.

At 1220 the UE 115 may retransmit or avoiding retransmitting the data to the base station based at least in part on the identified absolute latency value. The operations of 1220 may be performed according to the methods described herein. In certain examples, aspects of the operations of 1220 may be performed by a HARQ manager as described with reference to FIGS. 5 through 7.

Figure 13:
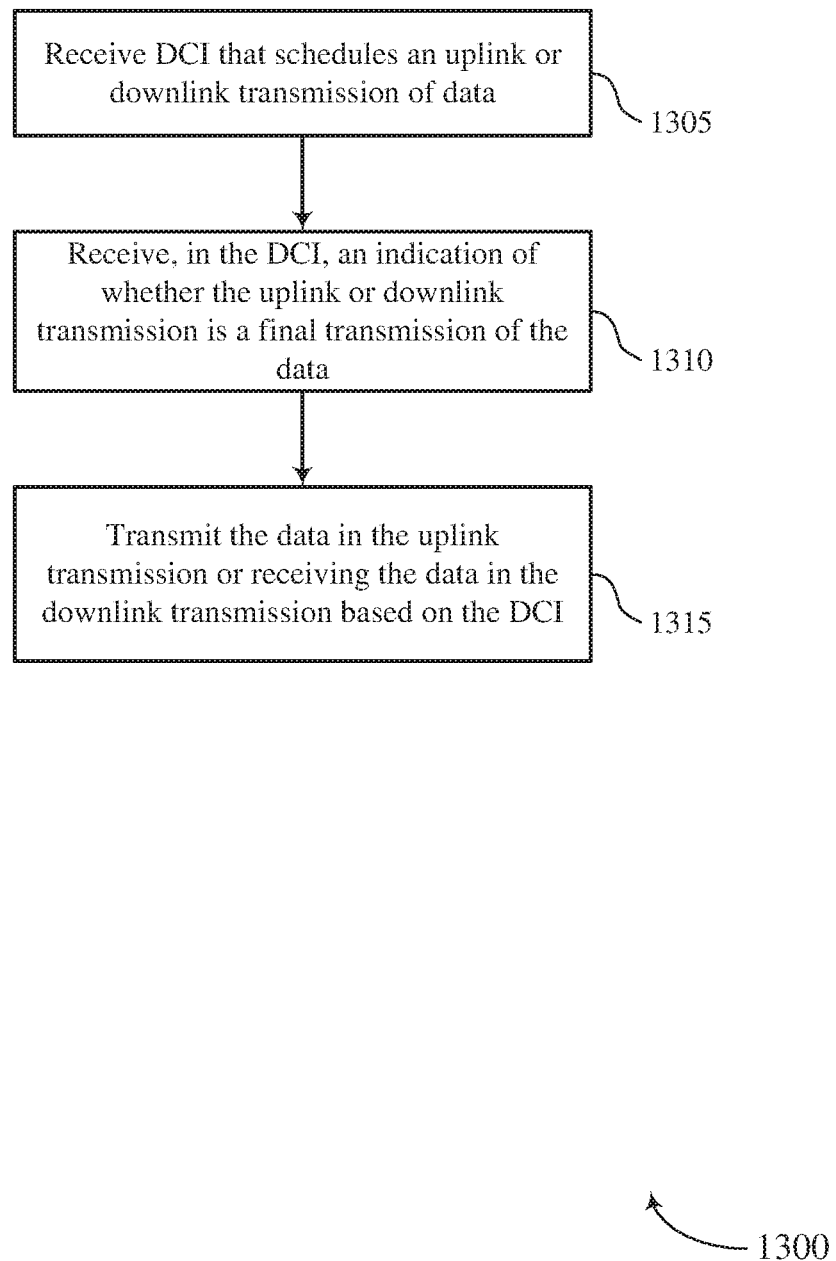

FIG. 13 shows a flowchart illustrating a method 1300 for dynamic termination of HARQ retransmissions in accordance with aspects of the present disclosure. The operations of method 1300 may be implemented by a UE 115 or its components as described herein. For example, the operations of method 1300 may be performed by a UE communications manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive DCI that schedules an uplink or downlink transmission of data. The operations of 1305 may be performed according to the methods described herein. In certain examples, aspects of the operations of 1305 may be performed by a DCI manager as described with reference to FIGS. 5 through 7.

At 1310 the UE 115 may receive, in the DCI, an indication of whether the uplink or downlink transmission is a final transmission of the data. The operations of 1310 may be performed according to the methods described herein. In certain examples, aspects of the operations of 1310 may be performed by a DCI manager as described with reference to FIGS. 5 through 7.

At 1315 the UE 115 may transmit the data in the uplink transmission or receiving the data in the downlink transmission based at least in part on the DCI. The operations of 1315 may be performed according to the methods described herein. In certain examples, aspects of the operations of 1315 may be performed by a transmitter as described with reference to FIGS. 5 through 7.

Figure 14:
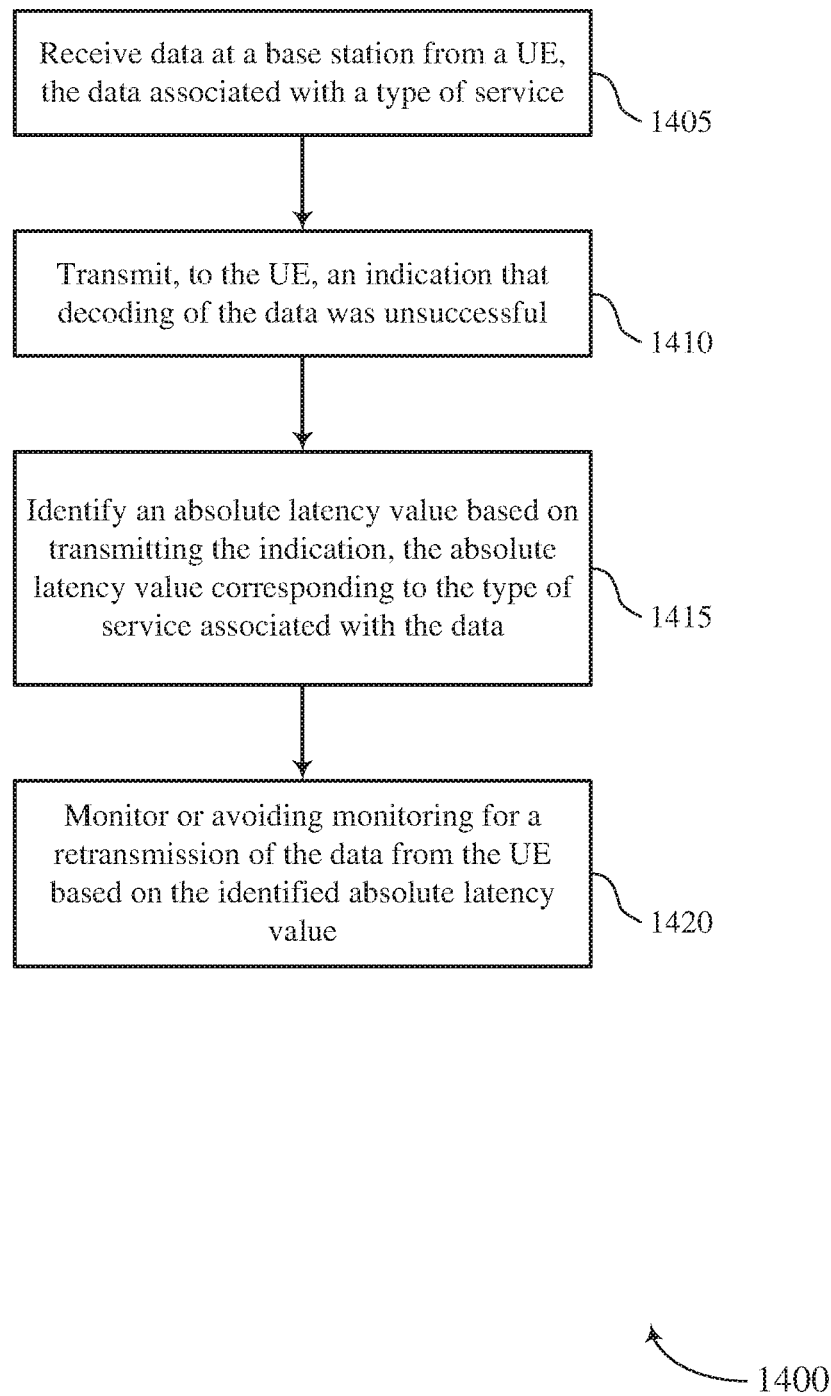

FIG. 14 shows a flowchart illustrating a method 1400 for dynamic termination of HARQ retransmissions in accordance with aspects of the present disclosure. The operations of method 1400 may be implemented by a base station 105 or its components as described herein. For example, the operations of method 1400 may be performed by a base station communications manager as described with reference to FIGS. 8 through 10. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may receive data at a base station from a UE, the data associated with a type of service. The operations of 1405 may be performed according to the methods described herein. In certain examples, aspects of the operations of 1405 may be performed by a receiver as described with reference to FIGS. 8 through 10.

At 1410 the base station 105 may transmit, to the UE, an indication that decoding of the data was unsuccessful. The operations of 1410 may be performed according to the methods described herein. In certain examples, aspects of the operations of 1410 may be performed by a HARQ manager as described with reference to FIGS. 8 through 10.

At 1415 the base station 105 may identify an absolute latency value based at least in part on transmitting the indication, the absolute latency value corresponding to the type of service associated with the data. The operations of 1415 may be performed according to the methods described herein. In certain examples, aspects of the operations of 1415 may be performed by a latency manager as described with reference to FIGS. 8 through 10.

At 1420 the base station 105 may monitor or avoiding monitoring for a retransmission of the data from the UE based at least in part on the identified absolute latency value. The operations of 1420 may be performed according to the methods described herein. In certain examples, aspects of the operations of 1420 may be performed by a HARQ manager as described with reference to FIGS. 8 through 10.

Figure 15:
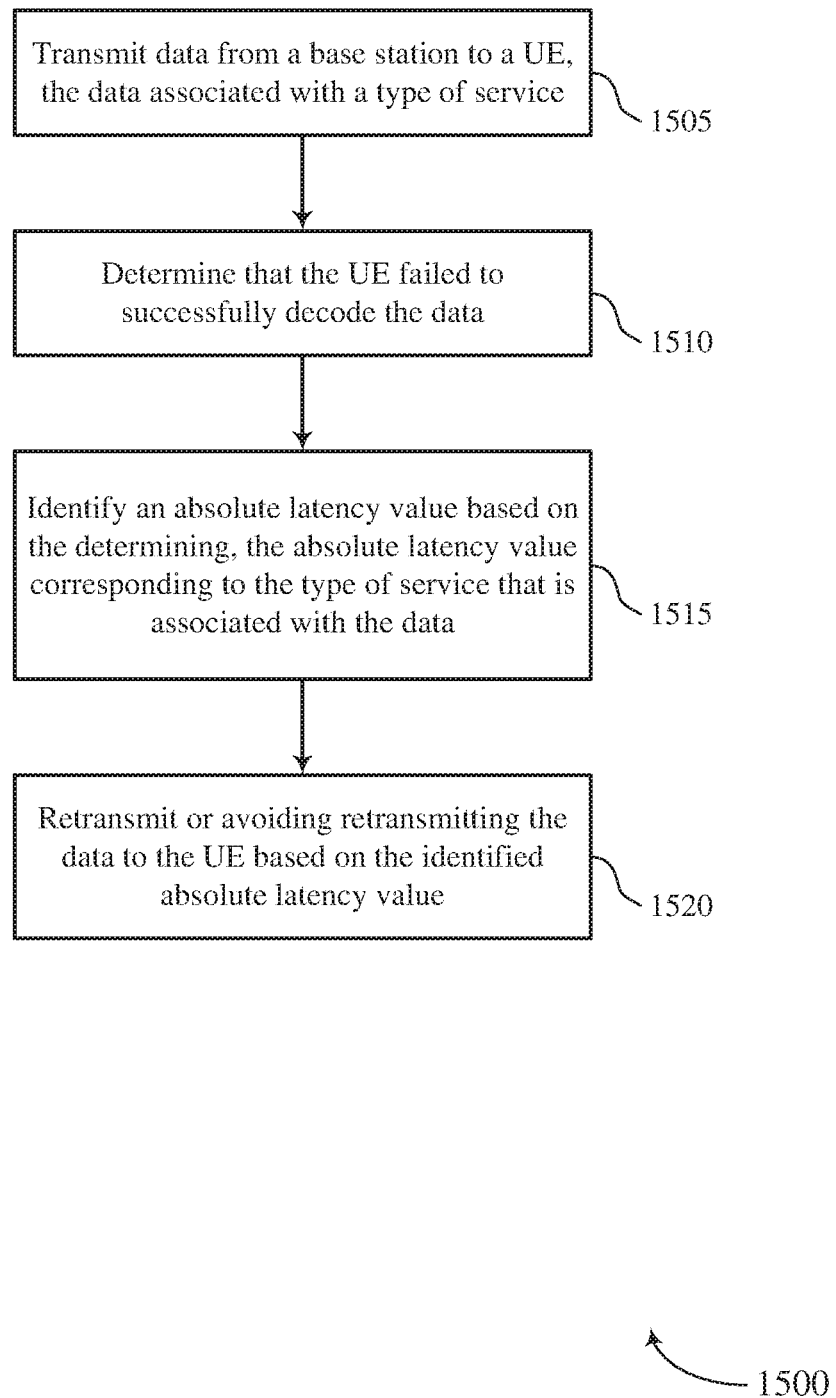

FIG. 15 shows a flowchart illustrating a method 1500 for dynamic termination of HARQ retransmissions in accordance with aspects of the present disclosure. The operations of method 1500 may be implemented by a base station 105 or its components as described herein. For example, the operations of method 1500 may be performed by a base station communications manager as described with reference to FIGS. 8 through 10. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may transmit data from a base station to a UE, the data associated with a type of service. The operations of 1505 may be performed according to the methods described herein. In certain examples, aspects of the operations of 1505 may be performed by a transmitter as described with reference to FIGS. 8 through 10.

At 1510 the base station 105 may determine that the UE failed to successfully decode the data. The operations of 1510 may be performed according to the methods described herein. In certain examples, aspects of the operations of 1510 may be performed by a HARQ manager as described with reference to FIGS. 8 through 10.

At 1515 the base station 105 may identify an absolute latency value based at least in part on the determining, the absolute latency value corresponding to the type of service that is associated with the data. The operations of 1515 may be performed according to the methods described herein. In certain examples, aspects of the operations of 1515 may be performed by a latency manager as described with reference to FIGS. 8 through 10.

At 1520 the base station 105 may retransmit or avoiding retransmitting the data to the UE based at least in part on the identified absolute latency value. The operations of 1520 may be performed according to the methods described herein. In certain examples, aspects of the operations of 1520 may be performed by a HARQ manager as described with reference to FIGS. 8 through 10.

Figure 16:
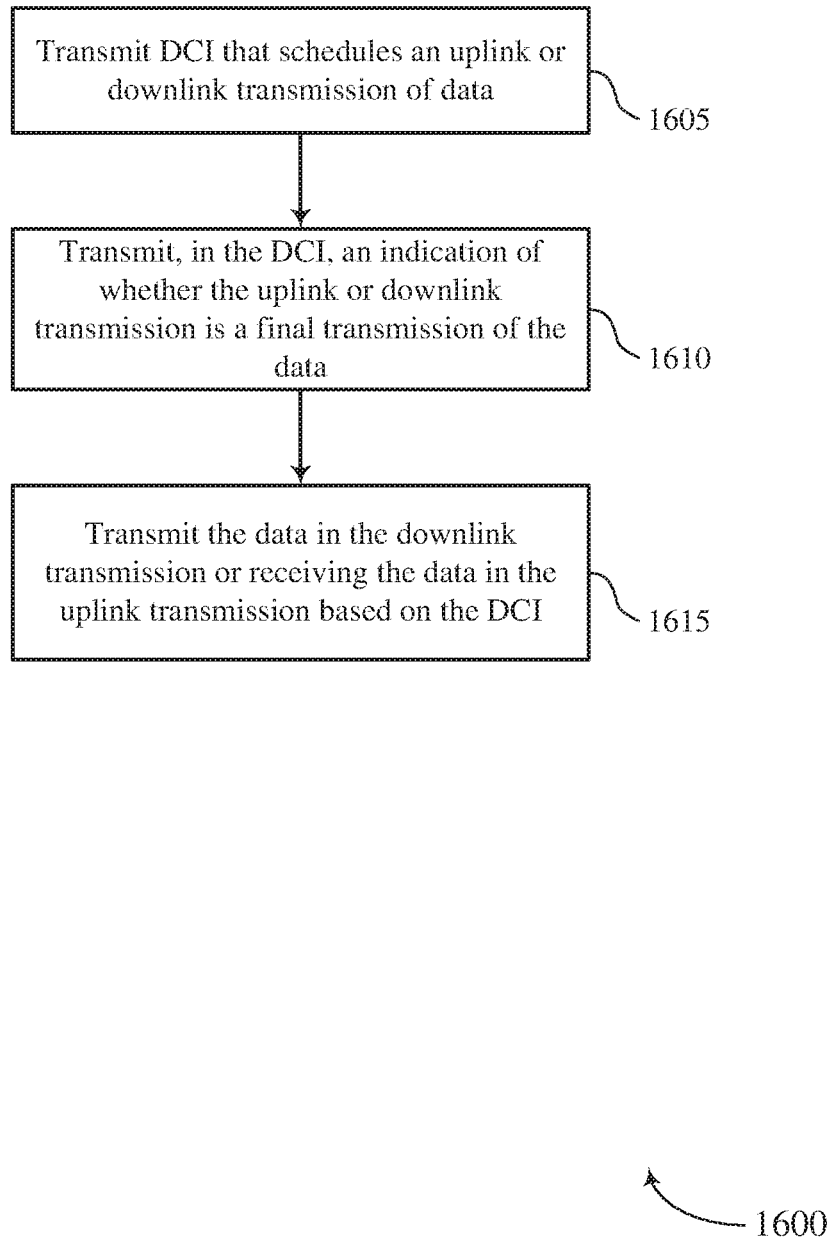

FIG. 16 shows a flowchart illustrating a method 1600 for dynamic termination of HARQ retransmissions in accordance with aspects of the present disclosure. The operations of method 1600 may be implemented by a base station 105 or its components as described herein. For example, the operations of method 1600 may be performed by a base station communications manager as described with reference to FIGS. 8 through 10. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may transmit DCI that schedules an uplink or downlink transmission of data. The operations of 1605 may be performed according to the methods described herein. In certain examples, aspects of the operations of 1605 may be performed by a DCI manager as described with reference to FIGS. 8 through 10.

At 1610 the base station 105 may transmit, in the DCI, an indication of whether the uplink or downlink transmission is a final transmission of the data. The operations of 1610 may be performed according to the methods described herein. In certain examples, aspects of the operations of 1610 may be performed by a DCI manager as described with reference to FIGS. 8 through 10.

At 1615 the base station 105 may transmit the data in the downlink transmission or receiving the data in the uplink transmission based at least in part on the DCI. The operations of 1615 may be performed according to the methods described herein. In certain examples, aspects of the operations of 1615 may be performed by a transmitter as described with reference to FIGS. 8 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    receiving an original transmission of data at a first wireless device from a second wireless device, the data associated with a type of service;
    transmitting, to the second wireless device, an indication that decoding of the data was unsuccessful;
    receiving signaling indicating an absolute latency value corresponding to the type of service associated with the data; and
    monitoring or avoiding monitoring for a retransmission of the data from the second wireless device based at least in part on whether a time elapsed since the original transmission of the data exceeds the absolute latency value.

2. The method of claim 1,
    wherein the signaling indicating the absolute latency value comprises radio resource control (RRC) signaling.

3. The method of claim 1, further comprising:
identifying the absolute latency value based at least in part on a table that indicates absolute latency values corresponding to different types of services.

4. The method of claim 1, further comprising:
determining that the time elapsed since the original transmission of the data fails to exceed the absolute latency value; and
monitoring for the retransmission of the data from the second wireless device based at least in part on the determining.

5. The method of claim 1, further comprising:
determining that the time elapsed since the original transmission of the data has exceeded the absolute latency value; and
avoiding monitoring for the retransmission of the data from the second wireless device based at least in part on the determining.

6. The method of claim 1, wherein a maximum number of retransmissions of the data is based at least in part on the absolute latency value corresponding to the type of service associated with the data.

7. The method of claim 1, wherein the first wireless device comprises a user equipment (UE) and the second wireless device comprises a base station, or wherein the first wireless device comprises a base station and the second wireless device comprises a UE.

8. A method for wireless communication, comprising:
transmitting an original transmission of data from a first wireless device to a second wireless device, the data associated with a type of service;
determining that the second wireless device failed to successfully decode the data;
receiving signaling indicating an absolute latency value corresponding to the type of service associated with the data; and
retransmitting or avoiding retransmitting the data to the second wireless device based at least in part on whether a time elapsed since the original transmission of the data exceeds the absolute latency value, wherein a maximum number of retransmissions of the data is based at least in part on the absolute latency value corresponding to the type of service associated with the data.

9. The method of claim 8, wherein the signaling indicating the absolute latency value comprises radio resource control (RRC) signaling.

10. The method of claim 8, further comprising:
identifying the absolute latency value based at least in part on a table that indicates absolute latency values corresponding to different types of services.

11. The method of claim 8, wherein determining that the second wireless device failed to successfully decode the data comprises:
receiving, from the second wireless device, an indication that decoding of the data was unsuccessful.

12. The method of claim 8, further comprising:
determining that the time elapsed since the original transmission of the data fails to exceed the absolute latency value; and
retransmitting the data to the second wireless device based at least in part on the determining.

13. The method of claim 8, further comprising:
determining that the time elapsed since the original transmission of the data has exceeded the absolute latency value; and
avoiding retransmitting the data to the second wireless device based at least in part on the determining.

14. The method of claim 8, wherein the first wireless device comprises a user equipment (UE) and the second wireless device comprises a base station, or wherein the first wireless device comprises a base station and the second wireless device comprises a UE.

15. An apparatus for wireless communication, comprising:
a processor;
memory coupled with the processor; and
instructions stored in the memory and executable by the processor to cause the apparatus to:
receive an original transmission of data at a first wireless device from a second wireless device, the data associated with a type of service;
transmit, to the second wireless device, an indication that decoding of the data was unsuccessful;
receive signaling indicating an absolute latency value corresponding to the type of service associated with the data; and
monitor or avoid monitoring for a retransmission of the data from the second wireless device based at least in part on whether a time elapsed since the original transmission of the data exceeds the absolute latency value.

16. The apparatus of claim 15, wherein the signaling indicating the absolute latency value comprises radio resource control (RRC) signaling.

17. The apparatus of claim 15, wherein the instructions are further executable by the processor to cause the apparatus to:
identify the absolute latency value based at least in part on a table that indicates absolute latency values corresponding to different types of services.

18. The apparatus of claim 15, wherein the instructions are further executable by the processor to cause the apparatus to:
determine that the time elapsed since the original transmission of the data fails to exceed the absolute latency value; and
monitor for the retransmission of the data from the second wireless device based at least in part on the determining.

19. The apparatus of claim 15, wherein the instructions are further executable by the processor to cause the apparatus to:
determine that the time elapsed since the original transmission of the data has exceeded the absolute latency value; and
avoid monitoring for the retransmission of the data from the second wireless device based at least in part on the determining.

20. The apparatus of claim 15, wherein a maximum number of retransmissions of the data is based at least in part on the absolute latency value corresponding to the type of service associated with the data.

21. The apparatus of claim 15, wherein the first wireless device comprises a user equipment (UE) and the second wireless device comprises a base station, or wherein the first wireless device comprises a base station and the second wireless device comprises a UE.

22. An apparatus for wireless communication, comprising:
- a processor;
- memory coupled with the processor; and
- instructions stored in the memory and executable by the processor to cause the apparatus to:
  - transmit an original transmission of data from a first wireless device to a second wireless device, the data associated with a type of service;
  - determine that the second wireless device failed to successfully decode the data;
  - receive signaling indicating an absolute latency value corresponding to the type of service associated with the data; and
  - retransmit or avoid retransmitting the data to the second wireless device based at least in part on whether a time elapsed since the original transmission of the data exceeds the absolute latency value, wherein a maximum number of retransmissions of the data is based at least in part on the absolute latency value corresponding to the type of service associated with the data.

23. The apparatus of claim 22, wherein the signaling indicating the absolute latency value comprises radio resource control (RRC) signaling.

24. The apparatus of claim 22, wherein the instructions are further executable by the processor to cause the apparatus to:
- identify the absolute latency value based at least in part on a table that indicates absolute latency values corresponding to different types of services.

25. The apparatus of claim 22, wherein the instructions to determine that the second wireless device failed to successfully decode the data are executable by the processor to cause the apparatus to:
- receive, from the second wireless device, an indication that decoding of the data was unsuccessful.

26. The apparatus of claim 22, wherein the instructions are further executable by the processor to cause the apparatus to:
- determine that the time elapsed since the original transmission of the data fails to exceed the absolute latency value; and
- retransmit the data to the second wireless device based at least in part on the determining.

27. The apparatus of claim 22, wherein the instructions are further executable by the processor to cause the apparatus to:
- determine that the time elapsed since the original transmission of the data has exceeded the absolute latency value; and
- avoid retransmitting the data to the second wireless device based at least in part on the determining.

28. The apparatus of claim 22, wherein the first wireless device comprises a user equipment (UE) and the second wireless device comprises a base station, or wherein the first wireless device comprises a base station and the second wireless device comprises a UE.

* * * * *